United States Patent
Bazzarella et al.

(10) Patent No.: US 11,594,793 B2
(45) Date of Patent: *Feb. 28, 2023

(54) SHORT-CIRCUIT PROTECTION OF BATTERY CELLS USING FUSES

(71) Applicant: 24M Technologies, Inc., Cambridge, MA (US)

(72) Inventors: Ricardo Bazzarella, Woburn, MA (US); Naoki Ota, Lexington, MA (US)

(73) Assignee: 24M Technologies, Inc., Cambridge, MA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/078,814

(22) Filed: Oct. 23, 2020

(65) Prior Publication Data

US 2021/0091366 A1 Mar. 25, 2021

Related U.S. Application Data

(63) Continuation of application No. 16/104,480, filed on Aug. 17, 2018, now Pat. No. 10,854,869.
(Continued)

(51) Int. Cl.
*H01M 50/581* (2021.01)
*H01M 50/531* (2021.01)
(Continued)

(52) U.S. Cl.
CPC ......... *H01M 50/581* (2021.01); *H01M 4/667* (2013.01); *H01M 4/668* (2013.01);
(Continued)

(58) Field of Classification Search
CPC .... H01M 50/10; H01M 50/20; H01M 50/581; H01M 50/50; H01M 50/531; H01M 50/543; H01M 4/74
See application file for complete search history.

(56) References Cited

U.S. PATENT DOCUMENTS 3,023,259 A * 2/1962 Coler .................... H01M 4/806
429/127
3,148,322 A 9/1964 Booe et al.
(Continued)

FOREIGN PATENT DOCUMENTS

CN 1218578 A 6/1999
CN 1268254 A 9/2000
(Continued)

OTHER PUBLICATIONS

Partial Supplementary European Search Report for European Application No. 18748587.5, dated Nov. 6, 2020, 11 pages.
(Continued)

*Primary Examiner* — Kenneth J Douyette
(74) *Attorney, Agent, or Firm* — Cooley LLP

(57) ABSTRACT

Apparatus, systems, and methods described herein relate to safety devices for electrochemical cells comprising an electrode tab electrically coupled to an electrode, the electrode including an electrode material disposed on a current collector. In some embodiments, a fuse can be operably coupled to or formed in the electrode tab. In some embodiments, the fuse can be formed by removing a portion of the electrode tab. In some embodiments, the fuse can include a thin strip of electrically resistive material configured to electrically couple multiple electrodes. In some embodiments, the current collector can include a metal-coated deformable mesh material such that the current collector is self-fusing. In some embodiments, the fuse can be configured to deform, break, melt, or otherwise discontinue electrical communication between the electrode and other components of the electrochemical cell in response to a high current condition, a high voltage condition, or a high temperature condition.

18 Claims, 9 Drawing Sheets

Related U.S. Application Data

(60) Provisional application No. 62/546,671, filed on Aug. 17, 2017.

(51) Int. Cl.
   *H01M 50/543* (2021.01)
   *H01M 4/66* (2006.01)
   *H01M 4/74* (2006.01)

(52) U.S. Cl.
   CPC ........... *H01M 4/74* (2013.01); *H01M 50/531* (2021.01); *H01M 50/543* (2021.01); *H01M 2200/103* (2013.01)

(56) References Cited

U.S. PATENT DOCUMENTS

| | | |
|---|---|---|
| 3,715,697 A | 2/1973 | Them |
| 3,918,995 A | 11/1975 | Palmer et al. |
| 4,992,339 A | 2/1991 | Georgopoulos |
| 5,776,627 A | 7/1998 | Mao et al. |
| 5,879,832 A | 3/1999 | Vu et al. |
| 5,998,051 A | 12/1999 | Poirier et al. |
| 6,168,880 B1 | 1/2001 | Snyder et al. |
| 6,204,635 B1 | 3/2001 | Sullivan |
| 6,544,679 B1 | 4/2003 | Petillo et al. |
| 6,562,517 B1 | 5/2003 | Misra et al. |
| 7,952,330 B2 | 5/2011 | Mori |
| 8,722,226 B2 | 5/2014 | Chiang et al. |
| 8,722,227 B2 | 5/2014 | Chiang et al. |
| 8,749,341 B2 | 6/2014 | Takeda et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,236,537 B2 | 3/2019 | Hamaguchi et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,665,836 B2 | 5/2020 | Cho et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,309,531 B2 | 4/2022 | Slocum et al. |
| 11,342,567 B2 | 5/2022 | Chiang et al. |
| 2001/0038938 A1 | 11/2001 | Takahashi et al. |
| 2004/0028995 A1 | 2/2004 | Shelekhin et al. |
| 2004/0081890 A1 | 4/2004 | Xing et al. |
| 2009/0286139 A1 | 11/2009 | Awano |
| 2009/0315666 A1 | 12/2009 | Ueda et al. |
| 2010/0021821 A1 | 1/2010 | Kim et al. |
| 2010/0047671 A1 | 2/2010 | Chiang et al. |
| 2010/0255351 A1 | 10/2010 | Ijaz et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0121936 A1 | 5/2012 | Baek et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0011060 A1 | 1/2014 | Yang et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170450 A1 | 6/2014 | Takahashi et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0140410 A1* | 5/2015 | Kim .................. H01M 50/572 429/160 |
| 2015/0171406 A1 | 6/2015 | Bazzarella et al. |
| 2015/0180033 A1 | 6/2015 | Oyama et al. |
| 2015/0280185 A1 | 10/2015 | Lampe-Onnerud et al. |
| 2015/0280202 A1 | 10/2015 | Lee et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0020042 A1 | 1/2016 | Stanton et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0141593 A1 | 5/2016 | Min et al. |
| 2016/0190544 A1 | 6/2016 | Slocum et al. |
| 2016/0211502 A1 | 7/2016 | Choi et al. |
| 2016/0218375 A1 | 7/2016 | Chiang et al. |
| 2016/0240896 A1* | 8/2016 | Zhang ............... H01M 10/0569 |
| 2016/0268621 A1 | 9/2016 | Chiang et al. |
| 2016/0308218 A1 | 10/2016 | Ota et al. |
| 2016/0315301 A1 | 10/2016 | Kim et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0279108 A1* | 9/2017 | Herle .................... H01M 4/139 |
| 2017/0288281 A1 | 10/2017 | Chiang et al. |
| 2018/0034090 A1 | 2/2018 | Chiang et al. |
| 2018/0102521 A1 | 4/2018 | Cho et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |

(56) References Cited

U.S. PATENT DOCUMENTS

| | | |
|---|---|---|
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0411825 A1 | 12/2020 | Bazzarella et al. |
| 2021/0091366 A1 | 3/2021 | Bazzarella et al. |
| 2021/0167351 A1 | 6/2021 | Zagars et al. |
| 2021/0202935 A1 | 7/2021 | Wang et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0265631 A1 | 8/2021 | Chen et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |

FOREIGN PATENT DOCUMENTS

| | | |
|---|---|---|
| CN | 1571882 A | 1/2005 |
| CN | 1598994 A | 3/2005 |
| CN | 101103509 A | 1/2008 |
| CN | 101595546 A | 12/2009 |
| CN | 101617419 A | 12/2009 |
| CN | 102460771 A | 5/2012 |
| CN | 102483046 A | 5/2012 |
| CN | 102800525 A | 11/2012 |
| CN | 106953059 A | 7/2017 |
| KR | 20130064465 A | 6/2013 |
| KR | 20140012264 A | 2/2014 |
| TW | 533641 B | 5/2003 |
| WO | WO-2013132228 A1 | 9/2013 |
| WO | WO 2016-049213 A1 * | 3/2016 |
| WO | WO 2016-132119 A1 * | 8/2016 |

OTHER PUBLICATIONS

Office Action for U.S. Appl. No. 15/886,281, dated Dec. 16, 2019, 15 pages.

Office Action for U.S. Appl. No. 15/886,281, dated Aug. 10, 2020, 26 pages.

International Search Report and Written Opinion for International Application No. PCT/US2018/016406, dated May 18, 2018, 11 pages.

Office Action for U.S. Appl. No. 15/941,673, dated Dec. 10, 2019, 7 pages.

International Search Report and Written Opinion for International Application No. PCT/US2018/025375, dated Jun. 27, 2018, 7 pages.

Office Action for U.S. Appl. No. 16/104,480, dated Apr. 17, 2020, 10 pages.

Office Action for U.S. Appl. No. 16/048,765, dated Dec. 11, 2020, 6 pages.

International Search Report and Written Opinion for International Application No. PCT/US2018/044378, dated Oct. 15, 2018, 8 pages.

Cannarella, J. et al., "Stress evolution and capacity fade in constrained lithium-ion pouch cells," Journal of Power Sources, vol. 245, Jul. 2013, pp. 745-751.

Extended European Search Report for European Application No. 18748587.5, dated Feb. 8, 2021, 13 pages.

Final Office Action for U.S. Appl. No. 15/886,281, dated Dec. 30, 2021, 20 Pages.

Final Office Action for U.S. Appl. No. 16/048,765, dated Mar. 10, 2021, 9 pages.

Non-final Office Action for U.S. Appl. No. 16/048,765, dated Nov. 15, 2021, 9 pages.

Non-Final Office Action for U.S. Appl. No. 15/886,281, dated Jun. 3, 2021, 26 pages.

Notice of Allowance for U.S. Appl. No. 16/048,765, dated Jun. 15, 2022, 7 pages.

Notice of Allowance for U.S. Appl. No. 15/886,281, dated Sep. 12, 2022, 8 pages.

Notice of Allowance for U.S. Appl. No. 16/048,765, dated Jul. 27, 2022, 4 pages.

Office Action for Chinese Application No. 201880018682.5, dated Jul. 19, 2022, 28 pages.

Office Action for Chinese Application No. 201880061848, dated Aug. 3, 2021, 23 pages.

Office Action for Chinese Application No. 201880018682.5, dated Sep. 26, 2021, 7 pages.

* cited by examiner

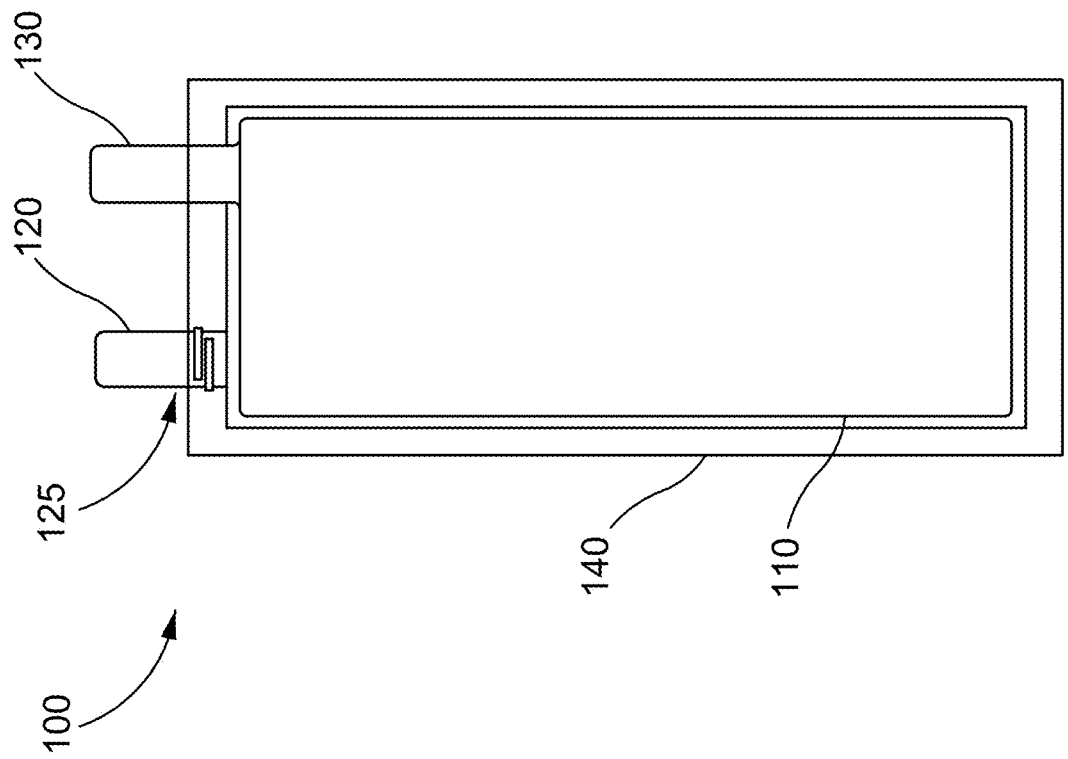
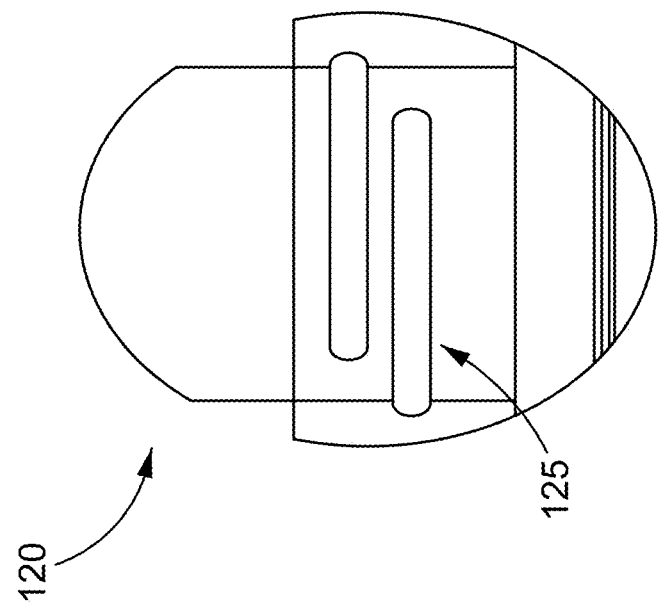
FIG. 1B
FIG. 1A

Position 1 → Insert Cell

Position 2 → Move top down

Position 3 → Punch

SHORT-CIRCUIT PROTECTION OF BATTERY CELLS USING FUSES

CROSS-REFERENCE TO RELATED APPLICATIONS

This application is a continuation of U.S. patent application Ser. No. 16/104,480 filed on Aug. 17, 2018, now U.S. Pat. No. 10,854,869, entitled "Short-Circuit Protection of Battery Cells Using Fuses," which claims" priority to, and the benefit of U.S. Provisional Application No. 62/546,671 filed on Aug. 17, 2017, entitled "Short-Circuit Protection of Battery Cells," the disclosures of which are incorporated herein by reference in their entireties.

BACKGROUND

Current interrupt devices (CIDs) in existing Li-ion cells are generally triggered by excessive gas generation within the Li-ion cells. To this end, a small headspace around the jellyroll is usually included in existing Li-ion cells. Once a cells begins to overcharge, excessive gas generated from overcharge can trigger a bi-stable metallic disk so as to disconnect one of the terminals. In some cases, gassing agents can be added to the cell to generate extra gas in an overcharge state, such as adding $Li_2CO_3$ to the positive electrode. However, these gassing agents can also introduce unwanted reactions within the cell, thereby increasing the resistance and decreasing the coulombic efficiency of the cell.

An alternative method is to use a bi-stable metallic strip to cause an external short circuit in the presence of excessive gas generation due to overcharge. This approach also relies on gas generation from the storage electrodes and therefore can impose similar tradeoffs between safety and cell performance.

CIDs using the above approaches also suffer from accidental triggers. In general, operations of these devices are more dependent on the temperature and pressure of the cell than on the cell voltage. However, the amount of gas generated by the storage electrodes can change significantly over the lifetime of a cell. At a safe cell voltage, an older cell may generate much more gas than a newer cell does. Therefore, CIDs based on internal cell pressure can cause an unsafe condition even though the cell is operating safely.

SUMMARY

Apparatus, systems, and methods described herein relate to safety devices for electrochemical cells comprising an electrode tab electrically coupled to an electrode, the electrode including an electrode material disposed on a current collector. In some embodiments, a fuse can be operably coupled to or formed in the electrode tab. In some embodiments, the fuse can be formed by removing a portion of the electrode tab. In some embodiments, the fuse can include a thin strip of electrically resistive material configured to electrically couple multiple electrodes. In some embodiments, the current collector can include a metal-coated deformable mesh material such that the current collector is self-fusing. In some embodiments, the fuse can be configured to deform, break, melt, or otherwise discontinue electrical communication between the electrode and other components of the electrochemical cell in response to a high current condition, a high voltage condition, or a high temperature condition.

BRIEF DESCRIPTION OF THE DRAWINGS

FIGS. 1A-1B shows a schematic of a battery system including a fuse to protect the battery cell from overcharging, according to embodiments.

DETAILED DESCRIPTION

Figure 2A:
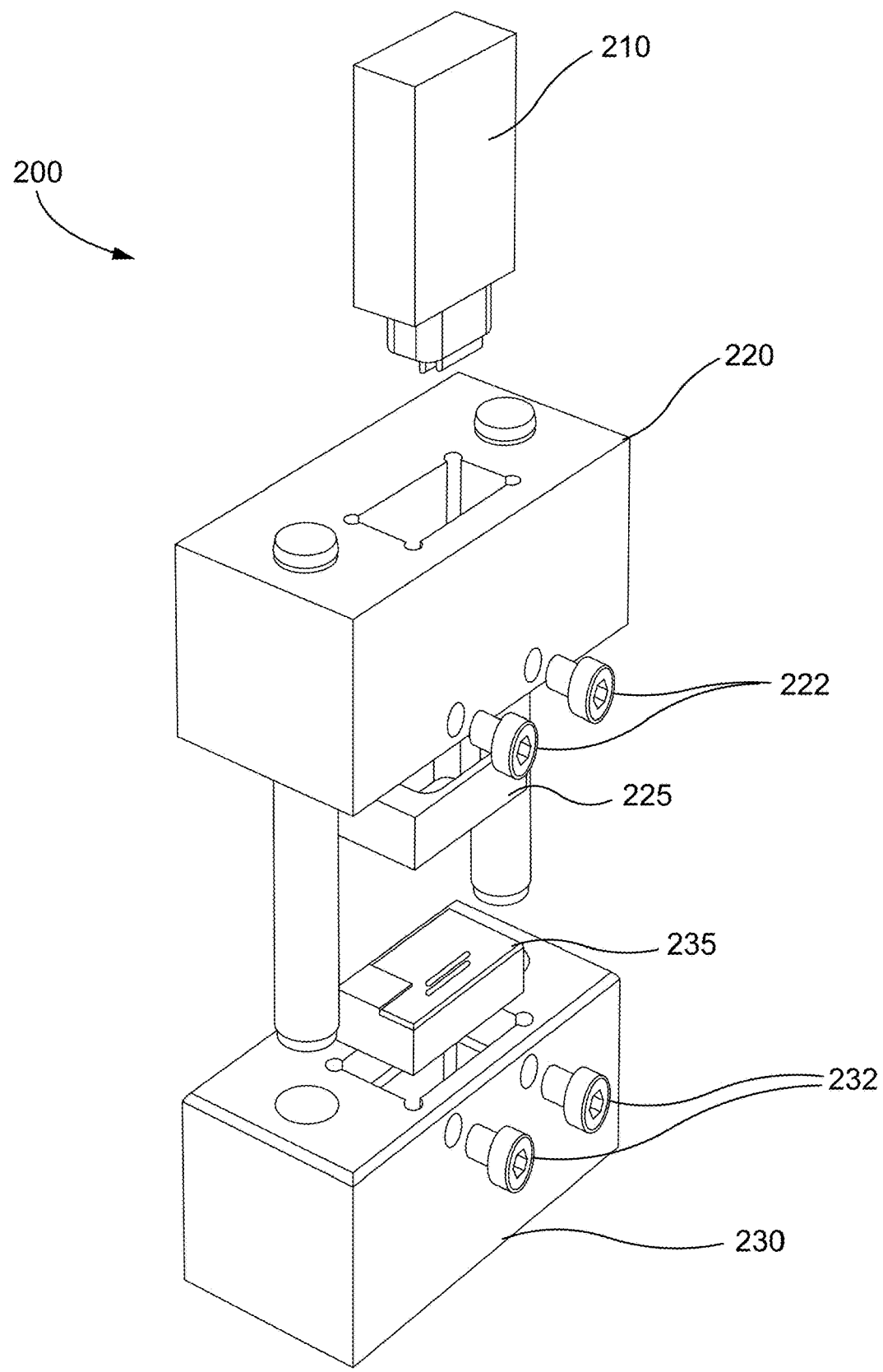
FIG. 2A shows a schematic of a device to manufacture the fuse shown in FIGS. 1A-1B, according to an embodiment.

Embodiments described herein relate generally to protection of battery cells from overcharging using current interrupt devices. In some embodiments, a battery system includes a battery cell that includes a cathode and an anode, a cathode tab electrically coupled to the cathode, and an anode tab electrically coupled to the anode. An interrupt device, such as a fuse, is operably coupled to at least one of the cathode tab or the anode tab or formed in at least one of the cathode tab and/or the anode tab. Upon overcharging of the battery cell, the voltage between the cathode tab and the anode tab causes the fuse to disconnect at least one of the cathode tab or the anode tab, thereby protecting the battery cell from further damage.

As used herein, the term "semi-solid" refers to a material that is a mixture of liquid and solid phases, for example, such as a particle suspension, colloidal suspension, emulsion, gel, slurry or micelle.

As used herein, the terms "condensed ion-storing liquid" or "condensed liquid" refers to a liquid that is not merely a solvent, as in the case of an aqueous flow cell catholyte or analyte, but rather, that is itself redox-active. Of course, such a liquid form may also be diluted by or mixed with another, non-redox-active liquid that is a diluent or solvent, including mixing with such a diluent to form a lower-melting liquid phase, emulsion or micelles including the ion-storing liquid.

As used in this specification, the terms "about" and "approximately" generally include plus or minus 10% of the value stated. For example, about 5 would include 4.5 to 5.5, approximately 10 would include 9 to 11, and about 100 would include 90 to 110.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

The Battery Cell

In some embodiments, the electrochemical cell includes a cathode (also referred to as a cathode material) disposed on a cathode current collector, an anode (also referred to as an anode material) disposed on an anode current collector, and an ion-permeable membrane (also described herein as a "separator") disposed in between. The assembly of the cathode, the cathode current collector, the anode, the anode current collector, and the separator is contained substantially in a battery enclosure, for example, a pouch. Any cathode tab can be electrically connected to the cathode current collector and extends beyond the pouch for connection with external circuit. Similarly, any anode tab can be electrically connected to the anode current collector and extends beyond the pouch for connection with external circuit.

In some embodiments, the cathode material can include, for example, Nickel Cobalt Aluminum (NCA), Core Shell Gradient (CSG), Spinel Lithium Manganese Oxide (LMO), High Voltage Spinel (LNMO), Lithium Iron Phosphate (LFP), Lithium Cobalt Oxide (LCO), and Nickel Cobalt Manganese (NCM), among others.

The anode material can be selected from a variety of materials. In some embodiments, the anode material comprises a carbon-based material, including, but not limited to, graphite, hard carbon, carbon nanotubes, carbon nanofibers, porous carbon, and graphene. In some embodiments, the anode material comprises a titanium-based oxide including, but are not limited to, spinel $Li_4Ti_5O_{12}$ (LTO) and titanium dioxide ($TiO_2$, Titania). In some embodiments, the anode material comprises alloy or de-alloy material including, but not limited to, silicon, silicon monoxide (SiO), germanium, tin, and tin oxide ($SnO_2$). In some embodiments, the anode material comprises a transition metal compound (e.g., oxides, phosphides, sulphides and nitrides). The general formula of a transition metal compound can be written as $M_xN_y$, where M can be selected from iron (Fe), cobalt (Co), copper (Cu), manganese (Mn), and nickel (Ni), and N can be selected from oxygen (O), phosphorous (P), sulfur (S), and nitrogen (N).

In some embodiments, the anode material comprises an intermetallic compound. An intermetallic compound can be based on a formulation MM', wherein M is one metal element and M' is a different metal element. An intermetallic compound can also include more than two metal elements. The M atoms of an intermetallic compound can be, for example, Cu, Li, and Mn, and the M' element of an intermetallic compound can be, for example, Sb. Exemplary intermetallic compounds include $Cu_2Sb$, $Li_2CuSb$, and $Li_3Sb$, among others. In one example, the intermetallic compound in the anode material can have fully disordered structures in which the M or M' atoms are arranged in a random manner. In another example, the intermetallic compound in the anode material has partially disordered structures in which the M or M' atoms in the crystal lattice are arranged in a non-random manner.

In some embodiments, the anode material can be porous so as to increase the surface area and enhance the rate of lithium intercalation in the resulting electrodes. In one example, the anode material includes porous $Mn_2O_3$, which can be prepared by, for example, thermal decomposition of $MnCO_3$ microspheres. In another example, the anode material includes porous carbon fibers prepared by, for example, electrospinning a blend solution of polyacrylonitrile and poly(l-lactide), followed by carbonization. In some embodiments, the porosity of the anode material can be achieved or increased by using a porous current collector. For example, the anode material can include $Cu_2Sb$, which is deposited conformally on a porous foam structure, to have certain degree of porosity.

In some embodiments, at least one of the anode material or the cathode material can include a semi-solid or a condensed ion-storing liquid reactant. By "semi-solid" it is meant that the material is a mixture of liquid and solid phases, for example, such as a semi-solid, particle suspension, colloidal suspension, emulsion, gel, slurry or micelle. "Condensed ion-storing liquid" or "condensed liquid" means that the liquid is not merely a solvent as it is in the case of an aqueous flow cell catholyte or anolyte, but rather, that the liquid is itself redox-active. Such a liquid form may also be diluted by or mixed with another, non-redox-active liquid that is a diluent or solvent, including mixing with such a diluent to form a lower-melting liquid phase, emulsion or micelles including the ion-storing liquid. In some embodiments, semi-solid electrode compositions (also referred to herein as "semi-solid suspension" and/or "slurry") can include a suspension of electrochemically-active agents (anode particulates and/or cathode particulates) and, optionally, electronically conductive particles. The cathodic particles and conductive particles are co-suspended in an electrolyte to produce a cathode semi-solid. The anodic particles and conductive particles are co-suspended in an electrolyte to produce an anode semi-solid. The semi-solids are capable of flowing due to an applied pressure, gravitational force, or other imposed field that exerts a force on the semi-solid, and optionally, with the aid of mechanical vibration. Examples of batteries utilizing semi-solid suspensions are described in U.S. Pat. No. 9,362,583, entitled "Semi-Solid Electrodes Having High Rate Capability," the entire disclosure of which is hereby incorporated by reference.

In some embodiments, an electrochemical cell includes an anode, and a semi-solid cathode. The semi-solid cathode includes a suspension of about 35% to about 75% by volume of an active material and about 0.5% to about 8% by volume of a conductive material in a non-aqueous liquid electrolyte. In some embodiments, the ion-permeable membrane (also described herein as the "separator") can be disposed between the anode and the semi-solid cathode. In some embodiments, the semi-solid cathode can have a thickness in the range of about 50 µm to about 3,000 µm, about 100 µm to about 2,500 µm, about 150 µm to about 2,000 µm, about 200 µm to about 1,500 µm, about 250 µm to about 1,000 µm, about 50 µm to about 2,500 µm, about 50 µm to about 2,000 µm, about 50 µm to about 1,500 µm, about 50 µm to about 1,000 µm, about 100 µm to about 3,000 µm, about 150 µm to about 3,000 µm, about 200 µm to about 3,000 µm, about 250 µm to about 3,000 µm, greater than about 50 µm, greater than about 100 µm, greater than about 150 µm, greater than about 200 µm, greater than about 250 µm, less than about 3,000 µm, less than about 2,500 µm, less than about 2,000 µm, less than about 1,500 µm, or less than about 1,000 µm, inclusive of all values and ranges therebetween. In some embodiments, the electrochemical cell can have an area specific capacity of at least about 5 mAh/cm² at a C-rate of C/4, at least about 6 mAh/cm² at a C-rate of C/4, at least about 7 mAh/cm² at a C-rate of C/4, at least about 8 mAh/cm² at a C-rate of C/4, at least about 9 mAh/cm² at a C-rate of C/4, at least about 10 mAh/cm² at a C-rate of C/4, at least about 11 mAh/cm² at a C-rate of C/4, or at least about 12 mAh/cm² at a C-rate of C/4, inclusive of all values and ranges therebetween. In some embodiments, the semi-solid cathode suspension can have an electronic conductivity of at least about $10^{-8}$ S/cm, at least about $10^{-7}$ S/cm, at least about $10^{-6}$ S/cm, at least about $10^{-5}$ S/cm, at least about $10^{-4}$ S/cm, at least about $10^{-3}$ S/cm, at least about $10^{-2}$ S/cm, or at least about $10^{-1}$ S/cm, inclusive of all values and ranges therebetween. In some embodiments, the semi-solid cathode suspension can have a mixing index of at least about 0.7, at least about 0.8, at least about 0.9, at least about 0.91, at least about 0.92, at least about 0.93, at least about 0.94, at least about 0.95, at least about 0.96, at least about 0.97, at least about 0.98, or at least about 0.99, inclusive of all values and ranges therebetween.

In some embodiments, an electrochemical cell includes a semi-solid anode and a semi-solid cathode. The semi-solid anode includes a suspension of about 35% to about 75% by volume of a first active material and about 0% to about 10% by volume of a first conductive material in a first non-aqueous liquid electrolyte. The semi-solid cathode includes a suspension of about 35% to about 75% by volume of a second active material, and about 0.5% to about 8% by volume of a second conductive material in a second non-aqueous liquid electrolyte. In some embodiments, the ion-permeable membrane is disposed between the semi-solid anode and the semi-solid cathode. Each of the semi-solid anode and the semi-solid cathode have a thickness of about 250 μm to about 2,000 μm and the electrochemical cell has an area specific capacity of at least about 7 mAh/cm² at a C-rate of C/4. In some embodiments, the first conductive material included in the semi-solid anode is about 0.5% to about 2% by volume. In some embodiments, the second active material included in the semi-solid cathode is about 50% to about 75% by volume.

In some embodiments, an electrochemical cell includes an anode and a semi-solid cathode. The semi-solid cathode includes a suspension of about 35% to about 75% by volume of an active material and about 0.5% to about 8% by volume of a conductive material in a non-aqueous liquid electrolyte. In some embodiments, the ion-permeable membrane is disposed between the anode and semi-solid cathode. The semi-solid cathode has a thickness in the range of about 250 μm to about 2,000 μm, and the electrochemical cell has an area specific capacity of at least about 7 mAh/cm² at a C-rate of C/2. In some embodiments, the semi-solid cathode suspension has a mixing index of at least about 0.9.

In some embodiments, an electrochemical cell includes a semi-solid anode and a semi-solid cathode. The semi-solid anode includes a suspension of about 35% to about 75% by volume of a first active material and about 0% to about 10% by volume of a first conductive material in a first non-aqueous liquid electrolyte. The semi-solid cathode includes a suspension of about 35% to about 75% by volume of a second active material, and about 0.5% to about 8% by volume of a second conductive material in a second non-aqueous liquid electrolyte. In some embodiments, the ion-permeable membrane is disposed between the semi-solid anode and the semi-solid cathode. Each of the semi-solid anode and the semi-solid cathode have a thickness of about 250 μm to about 2,000 μm and the electrochemical cell has an area specific capacity of at least about 7 mAh/cm² at a C-rate of C/2. In some embodiments, the first conductive material included in the semi-solid anode is about 0.5% to about 2% by volume. In some embodiments, the second active material included in the semi-solid cathode is about 50% to about 75% by volume.

In some embodiments, the electrode materials described herein can be a flowable semi-solid or condensed liquid composition. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive particles are co-suspended in an electrolyte to produce a semi-solid electrode. Examples of battery architectures utilizing semi-solid suspensions are described in International Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

In some embodiments, semi-solid electrode compositions (also referred to herein as "semi-solid suspension" and/or "slurry") described herein can be mixed in a batch process e.g., with a batch mixer that can include, e.g., a high shear mixture, a planetary mixture, a centrifugal planetary mixture, a sigma mixture, a CAM mixture, and/or a roller mixture, with a specific spatial and/or temporal ordering of component addition, as described in more detail herein. In some embodiments, slurry components can be mixed in a continuous process (e.g. in an extruder), with a specific spatial and/or temporal ordering of component addition.

The mixing and forming of a semi-solid electrode generally includes: (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments. For example, each step in the process can be performed manually or by any of a variety of process equipment. Each step can also include one or more sub-processes and, optionally, an inspection step to monitor process quality.

In some embodiments, the process conditions can be selected to produce a prepared slurry having a mixing index of at least about 0.80, at least about 0.90, at least about 0.95, or at least about 0.975. In some embodiments, the process conditions can be selected to produce a prepared slurry having an electronic conductivity of at least about 10'S/cm, at least about $10^{-5}$ S/cm, at least about $10^{-4}$ S/cm, at least about $10^{-3}$ S/cm, or at least about $10^{-2}$ S/cm. In some embodiments, the process conditions can be selected to produce a prepared slurry having an apparent viscosity at room temperature of less than about 100,000 Pa-s, less than about 10,000 Pa-s, or less than about 1,000 Pa-s, all at an apparent shear rate of 1,000 $s^{-1}$. In some embodiments, the process conditions can be selected to produce a prepared slurry having two or more properties as described herein. Examples of systems and methods that can be used for preparing the semi-solid compositions and/or electrodes are described in U.S. patent application Ser. No. 13/832,861, filed Mar. 15, 2013, entitled "Electrochemical Slurry Compositions and Methods for Preparing the Same," the entire disclosure of which is hereby incorporated by reference.

In some embodiments, one of both of the current collectors can include a conductive substrate. In one example, the conductive substrate comprises a metal material such as aluminum, copper, lithium, nickel, stainless steel, tantalum, titanium, tungsten, vanadium, or their combinations or alloys. In another example, the conductive substrate comprises a non-metal material such as carbon, carbon nanotubes, or a metal oxide or their combinations of composite (e.g., TiN, $TiB_2$, $MoSi_2$, n-$BaTiO_3$, $Ti_2O_3$, $ReO_3$, $RuO_2$, $IrO_2$, etc.).

In some embodiments, one or both of the current collectors can include a base substrate having one or more surface coatings so as to improve the mechanical, thermal, chemical, or electrical properties of the current collector. In one example, the coating(s) on the current collector can be configured to reduce corrosion and alter adhesion characteristics (e.g., hydrophilic or hydrophobic coatings, respectively). In another example, the coating(s) on the current collector can comprise a material of high electrical conductivity to improve the overall charge transport of the base substrate. In yet another example, the coatings can comprise a material of high thermal conductivity to facilitate heat dissipation of the base substrate and protect the battery from overheating. In yet another example, the coatings can comprise a heat-resistant or fire-retardant material to prevent the battery from fire hazards. In yet another example, the coatings can be configured to be rough so as to increase the surface area and/or the adhesion with the anode material. In yet another example, the coatings can include a material with good adhering or gluing properties with the anode material.

In some embodiments, one or both of the current collectors can include a conductive substrate having a roughened surface so as to improve the mechanical, electrical, and thermal contact between the anode material and the current collector. The roughened surface of the current collector can increase the physical contact area between the anode material and the current collector, thereby increasing the adherence of the anode material to the current collector. The increased physical contact area can also improve the electrical and thermal contact (e.g., reduced electrical and thermal resistance) between the current collector and the anode material.

In some embodiments, one or both of the current collectors can include a porous current collector such as a wire mesh. The wire mesh (also referred to herein as mesh) can include any number of filament wires that can be assembled in various configurations using suitable processes, such as a regular pattern or structure produced by weaving, braiding, knitting, etc. or a more random pattern or structure produced by randomly distributing wires and joining them by welding, adhesives, or other suitable techniques. Moreover, the wires comprising the mesh can be any suitable material. For example, in some embodiments, the wires are metallic such as, steel, aluminum, copper, titanium or any other suitable metal. In other embodiments, the wires can be a conductive non-metallic material such as, for example, carbon nanofiber or any other suitable material. In some embodiments, the wires can include coatings. For example, the coatings can be configured to reduce corrosion and enhance or reduce adhesion characteristics (e.g., hydrophilic or hydrophobic coatings, respectively). Examples of porous current collectors are described in U.S. Patent Publication No. U.S. 2013/0065122 A1, entitled "Semi-Solid Electrode Cell Having A Porous Current Collector and Methods of Manufacture," the entire disclosures of which is hereby incorporated by reference.

In some embodiments, the separator can be a thin, microporous membrane that electrically separates the anode from the cathode but allows ions to pass through the pores between the two electrolytes during discharging and charging. In some embodiments, the separator includes a thermoplastic polymer, such as polyolefins, polyvinyl chlorides, nylons, fluorocarbons, and polystyrenes, among others. In some embodiments, the separator includes polyolefins material that comprises, for example, polyethylene, ultra-high molecular weight polyethylene, polypropylene, polybutene, polymethylpentene, polyisoprene, copolymers thereof, and their combinations. Exemplary combinations can include, but are not limited to, mixtures containing two or more of the following polyethylene, ultra-high molecular weight polyethylene, and polypropylene, as well as, mixtures of the foregoing with copolymers such as ethylene-butene copolymer and ethylene-hexene copolymer.

In some embodiments, the separator can include thermosetting plastics, such as polyimide (PI), poly amide (PA), and poly amide imide (PAI), among others. In some embodiments, the separator can include a non-woven type separator. In some embodiments, the non-woven type separator can be made of ceramic fibers. In some embodiments, the non-woven type separator can be made of fibrillated fibers. In some embodiments, the non-woven type separator can be made of cellulose nanofibers.

The pouch in the electrochemical cell substantially contains the cathode, the cathode current collector, the anode, the anode current collector, and the separator. The pouch can physically separate the electrochemical cell from adjacent cells so as to mitigate or eliminate defect propagation, and to facilitate easy handling of the electrochemical cell during battery manufacturing. The pouch can also reduce the possibility of fire ignition of flammable electrolyte during possible welding processes in battery manufacturing, which at times generates sparks, when working with a semi-solid electrode.

In some embodiments, the cathode, the cathode current collector, the anode, the anode current collector, and the separator are sealed in the pouch (e.g., via vacuum sealing). In these embodiments, the pouch can still reduce or eliminate chances of exposure to sparking (e.g., from welding processes) that could ignite the electrolyte. A final sealing step can be carried out after the welding process to seal one or more single pouch battery cells into an external pouch or package, in which case the external pouch or package can function as moisture control. Examples of battery architectures utilizing single pouch battery cells are described in U.S. patent application Ser. No. 15/185,625, entitled "Single Pouch Battery Cells and Methods of Manufacture," the entire disclosure of which is hereby incorporated by reference.

In some embodiments, the pouch includes a three-layer structure, namely an intermediate layer sandwiched by an outer layer and an inner layer, wherein the inner layer is in contact with the electrodes and the electrolyte. For example, the outer layer can include a nylon-based polymer film. The inner layer can include a polypropylene (PP) polymer film, which can be corrosion-resistive to acids or other electrolyte and insoluble in electrolyte solvents. The intermediate layer can include of aluminum (Al) foil. This structure allows the pouch to have both high mechanical flexibility and strength.

In some embodiments, the outer layer of the pouch includes polymer materials such as polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), and their combinations.

In some embodiments, the intermediate layer of the pouch includes metal layers (foils, substrates, films, etc.) comprising aluminum (Al), copper (Cu), stainless steel (SUS), and their alloys or combinations.

In some embodiments, the inner layer of the pouch includes materials such as cast polypropylene (c-PP), polyethylene (PE), ethylene vinylacetate (EVA), and their combinations.

In some embodiments, the pouch includes a two-layer structure, namely an outer layer and an inner layer. In some embodiments, the outer layer can include PET, PBT, or other materials as described above. In some embodiments, the inner layer can include PP, PE, or other materials described above.

In some embodiments, the pouch can include a water barrier layer and/or gas barrier layer. In some embodiments, the barrier layer can include a metal layer and/or an oxide layer. In some embodiments, it can be beneficial to include the oxide layer because oxide layers tend to be insulating and can prevent short circuits within the battery.

In some embodiments, there can be only one (or two) unit cell(s) assembly within the pouch, the pouch can be substantially thinner than pouches commonly used for multi-stack battery cells. For example, the pouch can have a thickness less than about 500 µm, less than about 450 µm, less than about 400 µm, less than about 350 µm, less than about 300 µm, less than about 250 µm, less than about 200 µm, less than about 150 µm, less than about 100 µm, less than about 50 µm, less than about 45 µm, less than about 40 µm, less than about 35 µm, less than about 30 µm, less than about 29 µm, less than about 28 µm, less than about 27 µm, less than about 26 µm, less than about 25 µm, less than about 24 µm, less than about 23 µm, less than about 22 µm, less than about 21 µm, less than about 20 µm, less than about 19 µm, less than about 18 µm, less than about 17 µm, less than about 16 µm, less than about 15 µm, less than about 14 µm, less than about 13 µm, less than about 12 µm, less than about 11 µm, less than about 10 µm, less than about 9 µm, less than about 8 µm, less than about 7 µm, less than about 6 µm, or less than about 5 µm, inclusive of all values and ranges therebetween. The thickness of the pouch as used here can be defined as the thickness of the film that forms the pouch. In some embodiments, the pouch can be a laminate film, a single-ply film, a two-ply film, a three-ply film, or a film having greater than three ply. In some embodiments, the pouch can include more than one piece of film coupled together, for instance two, three, four, five, or greater than five pieces of film.

In some embodiments, the thickness of the pouch can depend on at least two aspects. In one aspect, it can be desirable to achieve high energy density in the resulting battery cells, in which case thinner pouches can be helpful since a larger portion of space within a battery cell can be reserved for electrode materials. In another aspect, it can be desirable to maintain or improve the safety advantage of the pouch. In this case, a thicker pouch can be helpful to, for example, reduce fire hazard. In some embodiments, the pouch thickness can be quantified as a ratio of the volume occupied by the pouch material to the total volume of the battery cell. In some embodiments, the pouch thickness can be about 5% to about 40% in terms of the ratio as defined above. In some embodiments, the pouch thickness can be about 10% to about 30% in terms of the ratio as defined above.

In some embodiments, the thickness of the electrochemical cell (including the thickness of the pouch and the thickness of the electrodes) can be about 100 µm to about 3 mm, about 150 µm to about 2.5 mm, about 200 µm to about 2 mm, about 250 µm to about 1.5 mm, about 300 µm to about 1 mm, about 100 µm to about 2.5 mm, about 100 µm to about 2 mm, about 100 µm to about 1.5 mm, about 100 µm to about 1 mm, about 150 µm to about 3 mm, about 200 µm to about 3 mm, about 250 µm to about 3 mm, about 300 µm to about 3 mm, about 500 µm to about 3 mm, about 750 µm to about 3 mm, about 1 mm to about 3 mm, or about 2 mm to about 3 mm, inclusive of all values and ranges therebetween. In some embodiments, the thickness of the electrochemical cell (including the thickness of the pouch and the thickness of the electrodes) can be greater than about 100 µm, 150 µm, 200 µm, 250 µm, 300 µm, 400 µm, 500 µm, 750 µm, 1 mm, 2 mm, or 3 mm, inclusive of all values and ranges therebetween. In some embodiments, the thickness of the electrochemical cell (including the thickness of the pouch and the thickness of the electrodes) can be less than about 3 mm, 2 mm, 1 mm, 750 µm, 500 µm, 400 µm, 300 µm, 250 µm, 200 µm, 150 µm, or 100 µm, inclusive of all values and ranges therebetween.

In some embodiments, the pouch includes a single layer of lower cost materials that are thinner. For example, these materials can be polypropylene or a combination of polyolefins that can be sealed together using heat or pressure (e.g., thermal fusion or vacuum sealing).

In some embodiments, the pouch includes a single layer of fire retardant materials so as to prevent the propagation of fire hazard from one single pouch battery cell to another. In some embodiments, the pouch includes an air-proof material so as to prevent the propagation of gas released by one single pouch battery cell to another, thereby reducing defect propagation.

In some embodiments, overcharging protection of battery systems using current interrupt devices can alternatively or additionally include fuses, e.g., for overcharging protection. A fuse can be any electrical safety device that operates in any fashion to protect the electrochemical cell from overcharging. Embodiments of the fuse-based current interrupt device include any fuse device and configuration. Embodiments of the fuse-based current interrupt device can be active or passive. Embodiments of the fuse-based current interrupt device can be sacrificial or non-sacrificial. Embodiments of the fuse-based current interrupt device can include any fuse described herein and any other fuse known in the art at the time of filing individually or in conjunction with any temperature-based, gas-based, pressure-based, or other current interrupt device known in the art at the time of filing.

In some embodiments, an electrochemical cell can include a cathode tab electrically coupled to a cathode and an anode tab electrically coupled to an anode, the anode separated from the cathode by an ion-permeable membrane. In some embodiments, at least one of the cathode tab and the anode tab can include a fuse configured to discontinue electrical communication through the at least one of the cathode tab and the anode tab. In some embodiments, the fuse can be formed by removing a portion of at least one of the cathode tab and the anode tab. In some embodiments, the fuse can be configured to discontinue communication of electrical current through the at least one of the cathode tab and the anode tab in response to a voltage reaching or exceeding a voltage threshold. In some embodiments, the fuse can include a plurality of thinned portions configured to break when a current being communicated through the fuse reaches or exceeds a current threshold. In some embodiments, the electrochemical cell can include a pouch material dimensioned and configured to contain the cathode, the anode, and the ion-permeable membrane. In some embodiments, the fuse is disposed within the pouch material. In some embodiments, the fuse can be manufactured by removing a plurality of portions of at least one of the anode tab and the cathode tab. In some embodiments, removing the plurality of portions of at least one of the anode tab and the cathode tab defines a plurality of apertures through at least one of the anode tab and the cathode tab. In some embodiments, a first aperture of the plurality of apertures can be positioned between about 100 µm and about 20 mm from a first edge of at least one of the anode tab and the cathode tab, and a second aperture of the plurality of apertures can be positioned between about 100 µm and about 20 mm from a second edge of at least one of the anode tab and the cathode tab, the second edge opposite the first edge. In some embodiments, the position of the first aperture and the second aperture forms a first bridge and a second bridge, respectively, through which current is communicated during normal operation of the electrochemical cell. In some embodiments, the fuse can be configured such that it will not break until a voltage of a current communicated through the fuse reaches or exceeds a voltage threshold. In some embodiments, the fuse can be configured such that it will not break until a current level of a current communicated through the fuse reaches or exceeds a current threshold.

In some embodiments, a method of manufacturing an electrode for an electrochemical cell can include disposing an electrode material onto a current collector, a portion of the current collector extending beyond the electrode material to form an electrode tab, and removing a portion of the electrode tab to form an aperture therethrough to form a fuse in the electrode tab. In some embodiments, the fuse can be configured to break when a current level of an electrical current communicated through the fuse reaches or exceeds a predetermined current level. In some embodiments, the fuse can be configured to break when a voltage of an electrical current communicated through the fuse reaches or exceeds a predetermined voltage. In some embodiments, the electrode tab can include a plurality of fuses configured to break when a current level of an electrical current communicated through the thinned portion reaches or exceeds a predetermined current level. In some embodiments, the electrode can be a cathode and the method can include disposing the cathode and an anode into a pouch with an ion-permeable membrane interposed therebetween to form an electrochemical cell. In some embodiments, the pouch can be dimensioned and configured to contain the cathode, the anode, the ion-permeable membrane, and the fuse. In some embodiments, the removing step can include removing a plurality of portions of the electrode tab to define a plurality of apertures therethrough. In some embodiments, a first aperture of the plurality of apertures can be positioned between about 100 µm and about 20 mm from a first edge of the electrode tab, and a second aperture of the plurality of apertures can be positioned between about 100 µm and about 20 mm from a second edge of the electrode tab, the second edge opposite the first edge. In some embodiments, the position of the first aperture and the second aperture can form a first thinned portion and a second thinned portion, respectively, through which current is communicated during normal operation of the electrochemical cell. In some embodiments, the fuse can be configured such that it will not break until a voltage of a current communicated through the fuse reaches or exceeds a voltage threshold. In some embodiments, the fuse can be configured such that it will not break until a current level of a current communicated through the fuse reaches or exceeds a current threshold.

In some embodiments, an electrochemical cell can include a cathode including a cathode current collector and a cathode material disposed on the cathode current collector, an anode including an anode current collector and an anode material disposed on the anode current collector, and an ion-permeable membrane interposed between the cathode and the anode. In some embodiments, at least one of the cathode current collector and the anode current collector can be configured to deform when a current level reaches or exceeds a predetermined current threshold. In some embodiments, at least one of the cathode and the anode can include a mesh comprising a polymer material. In some embodiments, the mesh can be spray-coated with a metal to form at least one of the cathode current collector or the anode current collector. In some embodiments, at least one of the cathode material and the anode material can include a semi-solid electrode material including an active material and a conductive material in a liquid electrolyte. In some embodiments, at least a portion of the porous current collector extends beyond the ion-permeable membrane to form at least one of a cathode tab and an anode tab. In some embodiments, the cathode current collector can be a first current collector of a plurality of current collectors, the plurality of current collectors electrically coupled together via a plurality of fuses. In some embodiments, the first current collector of the plurality of current collectors can include an electrode tab. In some embodiments, the cathode material can includes a mixture of a solid active material and a liquid electrolyte. In some embodiments, the anode current collector can be a first current collector of a plurality of current collectors, the plurality of current collectors electrically coupled together via a plurality of fuses. In some embodiments, the first current collector of the plurality of current collectors can include an electrode tab. In some embodiments, the anode material can include a mixture of a solid active material and a liquid electrolyte.

FIGS. 1A-1B show schematics of a battery system 100 including a fuse to protect the battery cell 100 from overcharging. The battery system 100 includes a battery cell 110 and a first tab 120 (e.g., a cathode tab) and a second tab 130 (e.g., an anode tab), collectively "the tabs 120 and 130, to connect the battery cell 110 to external circuit for charging and/or discharging. The battery cell 110 and part of the tabs 120 and 130 are enclosed in a pouch 140. FIG. 1B shows a magnified view of the first tab 120, which includes a narrowed region 125 defined by two elongated holes punched on the cathode tab 120. The narrowed region 125 has a smaller width for electrical current compared to the rest of the first tab 120. As understood in the art, a smaller width of the first tab 120 can lead to a larger resistance, which in turn can generate more heat. The heat, in combination with the smaller width, can cause the narrowed region 125 to preferentially deform, break, melt, or otherwise discontinue electrical current through the first tab 120 when the electrical current is above a threshold value. In some embodiments, the fuse can be integrated into the second tab 130 also or instead. In this manner, the battery system 100 can be configured to automatically disconnect from external circuit upon overcharging or during another unwanted operating condition or electrochemical cell failure condition.

In some embodiments, the absolute width of the narrowed region 125 can be about 100 µm to about 20 mm, about 500 µm to about 19 mm, about 750 µm to about 18 mm, about 0.5 mm to about 17 mm, about 1 mm to about 16 mm, about 1.5 mm to about 15 mm, about 2 mm to about 14 mm, about 3 mm to about 13 mm, about 4 mm to about 12 mm, about 5 mm to about 11 mm, about 6 mm to about 10 mm, about 7 mm to about 9 mm, about 0.5 mm to about 20 mm, about 100 µm to about 19 mm, about 100 µm to about 18 µm, about 100 µm to about 17 mm, about 100 µm to about 16 mm, about 100 µm to about 15 mm, about 100 µm to about 14 mm, about 100 µm to about 13 mm, about 100 µm to about 12 mm, about 100 µm to about 11 mm, about 100 µm to about 10 mm, about 100 µm to about 9 mm, about 100 µm to about 8 mm, about 100 µm to about 7 mm, about 100 µm to about 6 mm, about 100 µm to about 5 mm, about 100 µm to about 4 mm, about 100 µm to about 3 mm, about 100 µm to about 2 mm, about 100 µm to about 1 mm, about 100 µm to about 750 µm, about 100 µm to about 500 µm, about 500 µm to about 20 mm, about 750 µm to about 20 mm, about 0.5 mm to about 20 mm, about 1 mm to about 20 mm, about 2 mm to about 20 mm, about 3 mm to about 20 mm, about 4 mm to about 20 mm, about 5 mm to about 20 mm, about 6 mm to about 20 mm, about 7 mm to about 20 mm, about 8 mm to about 20 mm, about 9 mm to about 20 mm, about 10 mm to about 20 mm, about 11 mm to about 20 mm, about 12 mm to about 20 mm, about 13 mm to about 20 mm, about 14 mm to about 20 mm, about 15 mm to about 20 mm, about 16 mm to about 20 mm, about 17 mm to about 20 mm, about 18 mm to about 20 mm, or about 19 mm to about 20 mm, inclusive of all values and ranges therebetween. In some embodiments, the width of the narrowed region 125 can be greater than about 100 µm, about 500 µm, about 750 µm, about 0.5 mm, about 1 mm, about 2 mm, about 3 mm, about 4 mm, about 5 mm, about 6 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm, inclusive of all values and ranges therebetween. In some embodiments, the width of the narrowed region 125 can be less than about 20 mm, about 19 mm, about 18 mm, about 17 mm, about 16 mm, about 15 mm, about 14 mm, about 13 mm, about 12 mm, about 11 mm, about 10 mm, about 9 mm, about 8 mm, about 7 mm, about 6 mm, about 5 mm, about 4 mm, about 3 mm, about 2 mm, about 1 mm, about 750 µm, about 500 µm, or about 100 µm, inclusive of all values and ranges therebetween.

In some embodiments, the ratio of the width of the narrowed region 125 to the width of the first tab 120 can be about 1% to about 20% (e.g., about 1%, about 2%, about 3%, about 4%, about 5%, about 7.5%, about 10%, about 12.5%, about 15%, about 17.5%, or about 20%, including any values and sub ranges in between).

In some embodiments, the second tab 130 can also include a narrowed region to function as a fuse. In some embodiments, the battery system 100 can include two fuses: one defined on the first tab 120 and the other defined on the second tab 130. In some embodiments, the first tab 120 and/or the second tab 130 can include more than one narrowed region to function as fuses. In some embodiments, a portion of the electrode tab material (e.g., for the first tab 120 or the second tab 130) can be thinned, stretched, stamped, etched, heat treated, or otherwise configured to create a higher resistance path through the electrode tab. In some embodiments, a portion of the electrode tab material ca be removed via laser cutting.

Figure 2B:
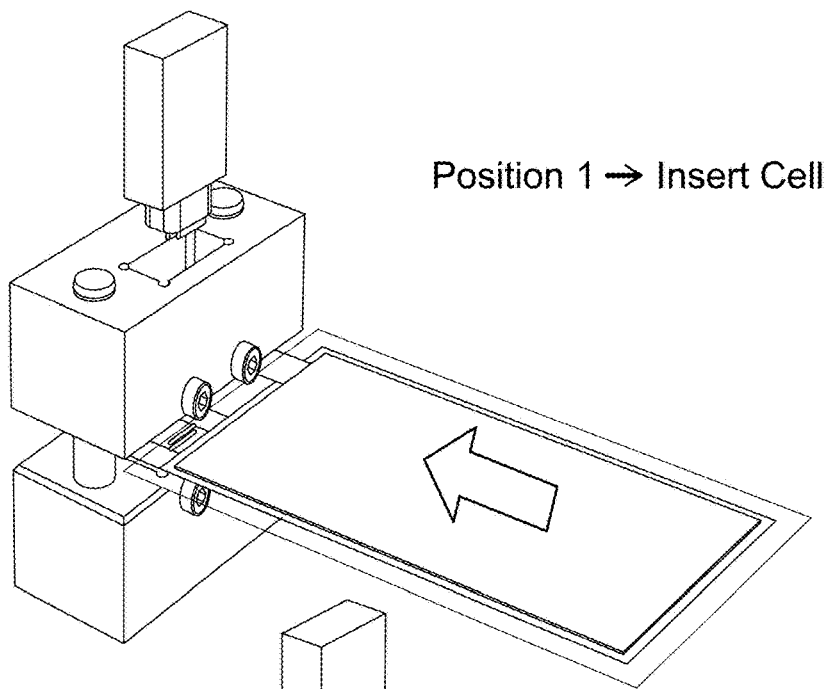
FIGS. 2B-2D illustrate a method of manufacturing the fuse as shown in FIGS. 1A-1B, according to embodiments.
Figure 2C:
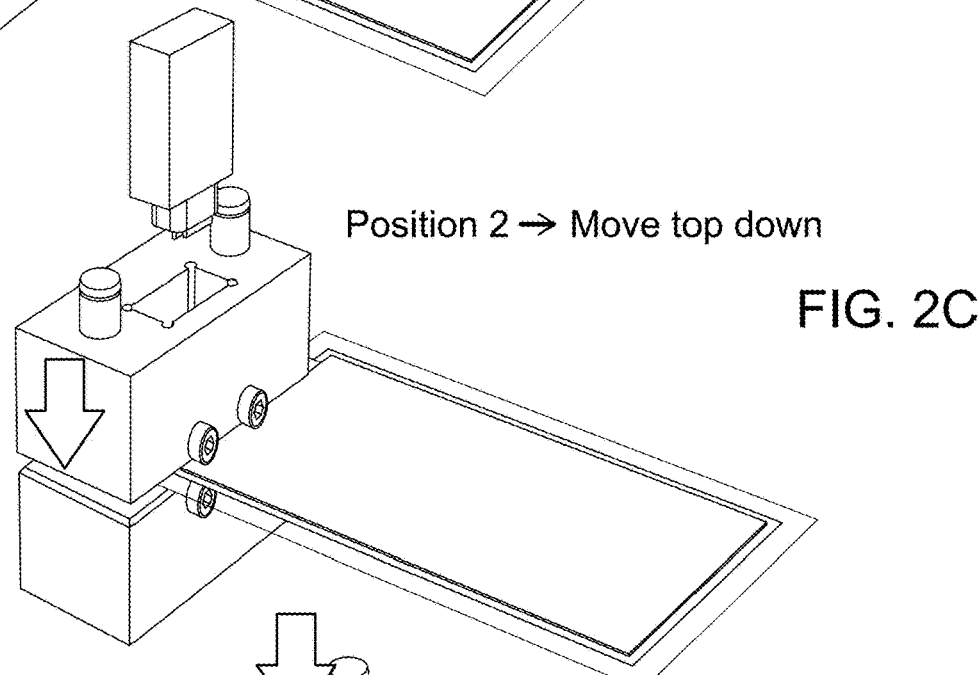
Figure 2D:
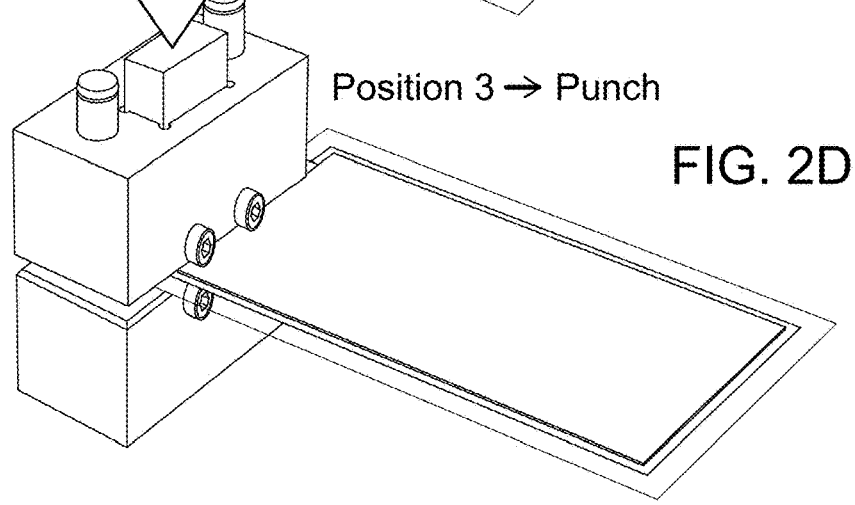

FIG. 2A shows a schematic of a device 200 to manufacture the fuse shown in FIGS. 1A-1B, according to embodiments. FIGS. 2B-2D illustrate a method of manufacturing the fuse as shown in FIGS. 1A-1B, according to embodiments. The device 200 includes a punch 210 to make holes in metal sheets via punching. The device 200 also includes a top portion 220 and a bottom portion 230. A removable top die 225 is secured to the top portion 220 via M4 screws 222. Similarly, a removable cutting die 235 is secured to the bottom portion 230 via M4 screws 232.

The method to manufacture the fuses shown in FIG. 1A can include three steps, shown in FIGS. 2B-2D, respectively. In FIG. 2B, a battery cell is provided with at least one of the tabs positioned between the top portion 220 and the bottom portion 230 of the device 200. In FIG. 2C, the battery cell is secured to the device 200 by securing the top portion 220 of the device against the bottom portion 230 of the device 200 (e.g., moving down the top portion 220 and/or moving up the bottom portion 230). In FIG. 2D, elongated holes (or other shapes of holes) are made by pressing the punch 210 and fuses like those shown in FIGS. 1A-2B can be defined.

In FIGS. 2A-2D, the removable cutting die 235 includes two parallel cutting blades to make elongated holes. In some embodiments, the removable cutting die 235 can be configured to make other shapes of holes (e.g., round, elliptical, etc.) by changing the shape of the cutting blades.

Figure 3:
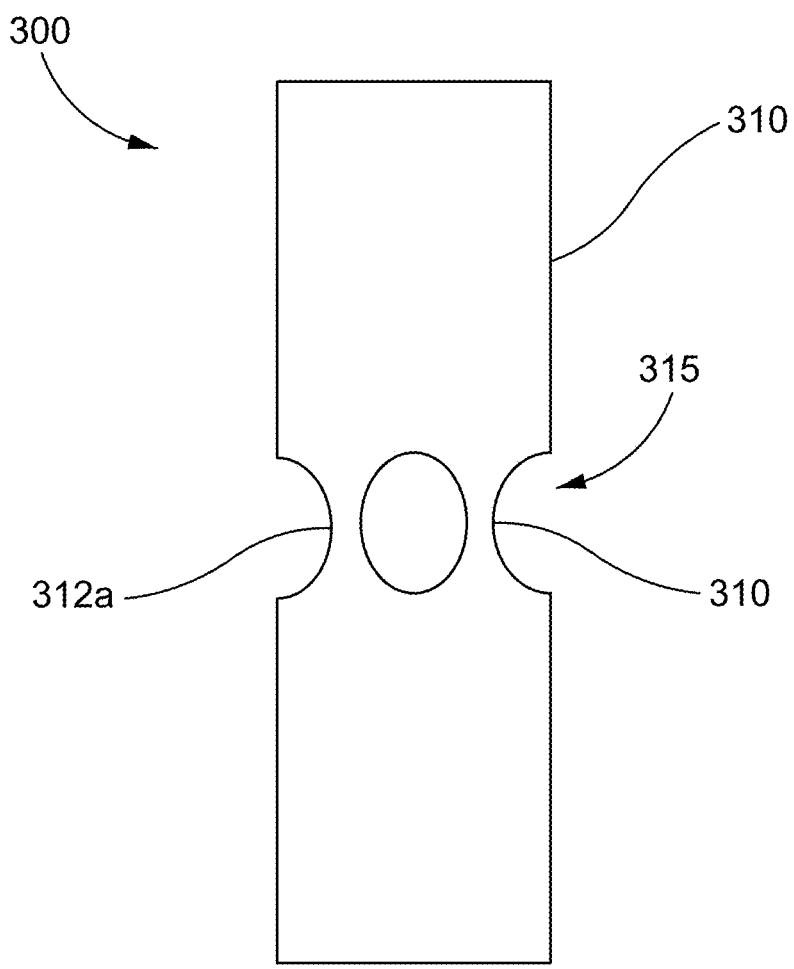
FIG. 3 shows a top view of an electrode tab including a holed region that can be used as a fuse for overcharge protection, according to an embodiment.

FIG. 3 shows a schematic of an electrode tab 300 configured to electrically couple an electrode to other components of an electrochemical cell. In some embodiments, the electrode tab 300 can include a fuse region 315 defined by one or more apertures defined in the electrode tab 300 by removing a portion or portions of electrode tab material. The fused region 315 includes two bridges 312a and 312b to electrically connect the top portion of the electrode tab 300 with the bottom portion of the tab 300. The total width of the two bridges 312a and 312b are smaller than the width of other parts of the electrode tab 300. Therefore, upon overcharging, the two bridges 312a and 312b can preferentially deform, break, melt, or otherwise discontinue communication of electrical charge through the electrode tab 300, thereby disconnecting the electrode tab 300 from the electrochemical cell and protecting the electrode and/or electrochemical cell from catastrophic failure. In some embodiments, the electrode tab 300 comprising a fuse region 315 is removably coupled to either the anode or cathode such that the electrode tab 300 can be replaced once the bridges 312a and 312b deform, break, melt, or otherwise discontinue communication of electrical charge through the electrode tab 300 to prevent overcharging.

In some embodiments, the width of the bridges 312a, 312b can be defined by the diameter of apertures formed in the electrode tab can be round, oblong, square, rectangular, triangular, or any other suitable shape. In some embodiments, the apertures formed in the electrode tab can be centered within the electrode tab. In some embodiments, the apertures formed in the electrode tab can be positioned nearby to an edge of the electrode tab. In some embodiments, the apertures formed in the electrode tab can be positioned such that a portion of one or more edges of the electrode tab is removed.

In some embodiments, the width of each bridge 312a or 312b can be about 100 µm to about 20 mm, about 500 µm to about 19 mm, about 750 µm to about 18 mm, about 0.5 mm to about 17 mm, about 1 mm to about 16 mm, about 1.5 mm to about 15 mm, about 2 mm to about 14 mm, about 3 mm to about 13 mm, about 4 mm to about 12 mm, about 5 mm to about 11 mm, about 6 mm to about 10 mm, about 7 mm to about 9 mm, about 0.5 mm to about 20 mm, about 100 µm to about 19 mm, about 100 µm to about 18 µm, about 100 µm to about 17 mm, about 100 µm to about 16 mm, about 100 µm to about 15 mm, about 100 µm to about 14 mm, about 100 µm to about 13 mm, about 100 µm to about 12 mm, about 100 µm to about 11 mm, about 100 µm to about 10 mm, about 100 µm to about 9 mm, about 100 µm to about 8 mm, about 100 µm to about 7 mm, about 100 µm to about 6 mm, about 100 µm to about 5 mm, about 100 µm to about 4 mm, about 100 µm to about 3 mm, about 100 µm to about 2 mm, about 100 µm to about 1 mm, about 100 µm to about 750 µm, about 100 µm to about 500 µm, about 500 µm to about 20 mm, about 750 µm to about 20 mm, about 0.5 mm to about 20 mm, about 1 mm to about 20 mm, about 2 mm to about 20 mm, about 3 mm to about 20 mm, about 4 mm to about 20 mm, about 5 mm to about 20 mm, about 6 mm to about 20 mm, about 7 mm to about 20 mm, about 8 mm to about 20 mm, about 9 mm to about 20 mm, about 10 mm to about 20 mm, about 11 mm to about 20 mm, about 12 mm to about 20 mm, about 13 mm to about 20 mm, about 14 mm to about 20 mm, about 15 mm to about 20 mm, about 16 mm to about 20 mm, about 17 mm to about 20 mm, about 18 mm to about 20 mm, or about 19 mm to about 20 mm, inclusive of all values and ranges therebetween. In some embodiments, the width of each bridge 312a and 312b can be greater than about 100 µm, about 500 µm, about 750 µm, about 0.5 mm, about 1 mm, about 2 mm, about 3 mm, about 4 mm, about 5 mm, about 6 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm, inclusive of all values and ranges therebetween. In some embodiments, the width of each bridge 312a and 312b can be less than about 20 mm, about 19 mm, about 18 mm, about 17 mm, about 16 mm, about 15 mm, about 14 mm, about 13 mm, about 12 mm, about 11 mm, about 10 mm, about 9 mm, about 8 mm, about 7 mm, about 6 mm, about 5 mm, about 4 mm, about 3 mm, about 2 mm, about 1 mm, about 750 µm, about 500 µm, or about 100 µm, inclusive of all values and ranges therebetween.

In some embodiments, the ratio of the width of each bridge 312a or 312b to the width of the tab 300 can be about 1% to about 20% (e.g., about 1%, about 2%, about 3%, about 4%, about 5%, about 7.5%, about 10%, about 12.5%, about 15%, about 17.5%, or about 20%, including any values and sub ranges in between).

In some embodiments, the tab 300 can include more than two bridges 312a and 312b. For example, the tab 300 can include three bridges defined by two complete holes within the tab 300 and two half holes on each side of the tab 300. Other numbers of bridges are also possible.

Figure 4:
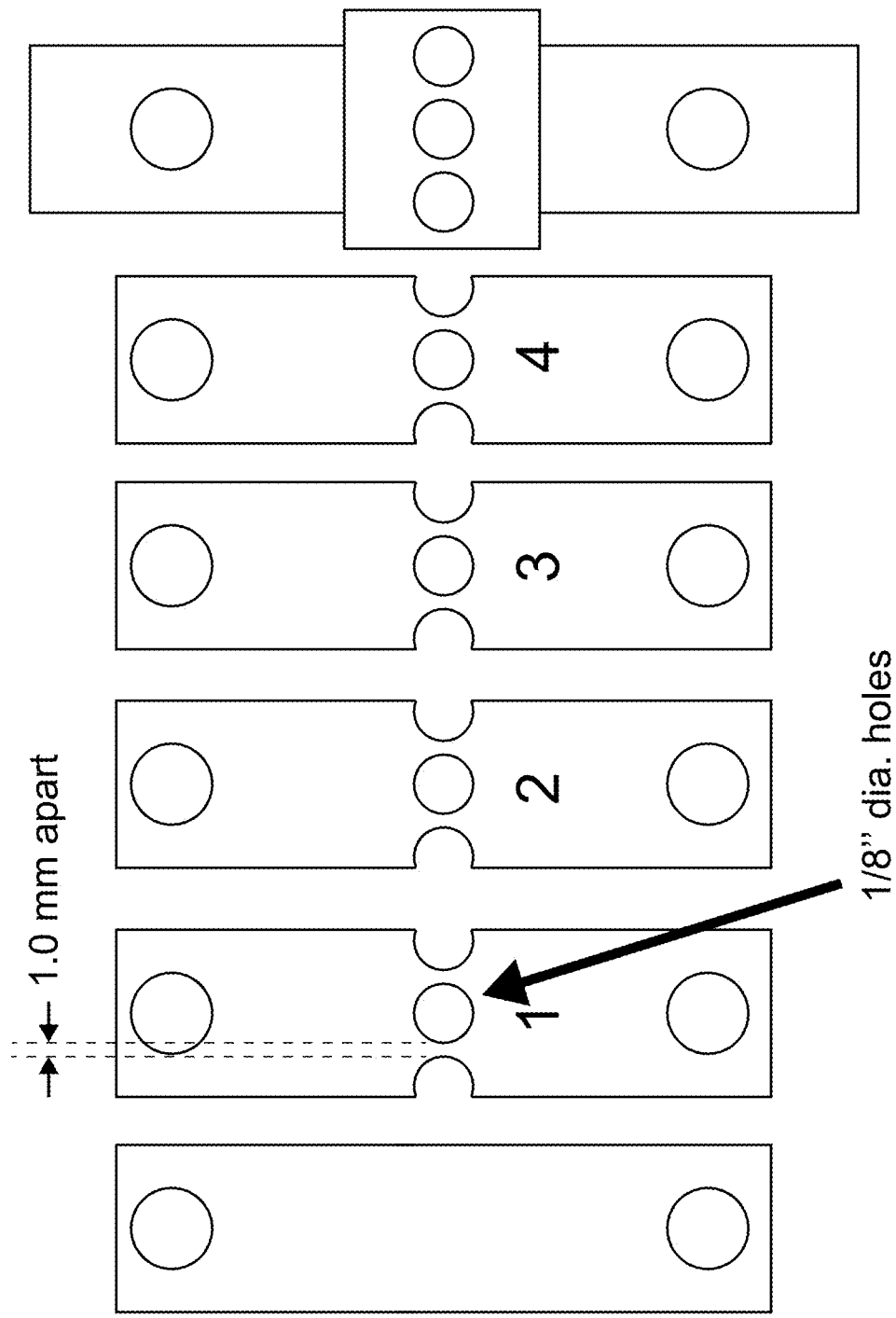
FIG. 4 shows a top view of electrode tabs, according to embodiments.

FIG. 4 is a top view of electrode tabs including a fuse integral to the electrode tab. The electrode tabs shown in FIG. 4 include two bridges, each of which has a width of about 1 mm. The electrode tabs shown in FIG. 4 include a plurality of apertures in each electrode tab having a diameter of about ⅛ inch. In some embodiments, the apertures formed in the electrode tab can be round, oblong, square, rectangular, triangular, or any other suitable shape. In some embodiments, the apertures formed in the electrode tab can be centered within the electrode tab. In some embodiments, the apertures formed in the electrode tab can be positioned nearby to an edge of the electrode tab. In some embodiments, the apertures formed in the electrode tab can be positioned such that a portion of one or more edges of the electrode tab is removed.

In some embodiments, two thinned portion of electrode tab material can be formed when three apertures are defined in the electrode tab by removing three portions of the electrode tab, as shown in FIG. 4. In some embodiments, the thinned portion (bridges) can have a width defined by the distance between each aperture, the diameter of each aperture, and/or the width of the electrode tab. In some embodiments, the thinned portion can be between about 100 µm to about 20 mm, about 500 µm to about 19 mm, about 750 µm to about 18 mm, about 0.5 mm to about 17 mm, about 1 mm to about 16 mm, about 1.5 mm to about 15 mm, about 2 mm to about 14 mm, about 3 mm to about 13 mm, about 4 mm to about 12 mm, about 5 mm to about 11 mm, about 6 mm to about 10 mm, about 7 mm to about 9 mm, about 0.5 mm to about 20 mm, about 100 µm to about 19 mm, about 100 µm to about 18 µm, about 100 µm to about 17 mm, about 100 µm to about 16 mm, about 100 µm to about 15 mm, about 100 µm to about 14 mm, about 100 µm to about 13 mm, about 100 µm to about 12 mm, about 100 µm to about 11 mm, about 100 µm to about 10 mm, about 100 µm to about 9 mm, about 100 µm to about 8 mm, about 100 µm to about 7 mm, about 100 µm to about 6 mm, about 100 µm to about 5 mm, about 100 µm to about 4 mm, about 100 µm to about 3 mm, about 100 µm to about 2 mm, about 100 µm to about 1 mm, about 100 µm to about 750 µm, about 100 µm to about 500 µm, about 500 µm to about 20 mm, about 750 µm to about 20 mm, about 0.5 mm to about 20 mm, about 1 mm to about 20 mm, about 2 mm to about 20 mm, about 3 mm to about 20 mm, about 4 mm to about 20 mm, about 5 mm to about 20 mm, about 6 mm to about 20 mm, about 7 mm to about 20 mm, about 8 mm to about 20 mm, about 9 mm to about 20 mm, about 10 mm to about 20 mm, about 11 mm to about 20 mm, about 12 mm to about 20 mm, about 13 mm to about 20 mm, about 14 mm to about 20 mm, about 15 mm to about 20 mm, about 16 mm to about 20 mm, about 17 mm to about 20 mm, about 18 mm to about 20 mm, or about 19 mm to about 20 mm, inclusive of all values and ranges therebetween. In some embodiments, the thinned portion can have a width greater than about 100 µm, about 500 µm, about 750 µm, about 0.5 mm, about 1 mm, about 2 mm, about 3 mm, about 4 mm, about 5 mm, about 6 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm, inclusive of all values and ranges therebetween. In some embodiments, the thinned portion can have a width of less than about 20 mm, about 19 mm, about 18 mm, about 17 mm, about 16 mm, about 15 mm, about 14 mm, about 13 mm, about 12 mm, about 11 mm, about 10 mm, about 9 mm, about 8 mm, about 7 mm, about 6 mm, about 5 mm, about 4 mm, about 3 mm, about 2 mm, about 1 mm, about 750 µm, about 500 µm, or about 100 µm, inclusive of all values and ranges therebetween.

In some embodiments, the fuse can be made of any material typically used for anode or cathode terminals or tabs, such as aluminum, copper, nickel, zinc, any combination thereof. In some embodiments, the fuse is formed by removing material from the anode tab and/or the cathode tab using the punch and die method described herein. In some embodiments, a plurality of fuses can be used to provide additional overcharge protection to the battery cell. In some embodiments, where the fuse is formed by removing material from at least one of the anode tab and the cathode tab, the fuse is formed by punching a generally round hole in the tab. In some embodiments, a plurality of holes can be punched in at least one of the anode tab and the cathode tab, forming the fuse. In some embodiments, the plurality of holes that are formed in the tab or tabs can be any number of holes (e.g., 2 holes, 3 holes, 4 holes, 5 holes, 6 holes, 7 holes, 8 holes, 9 holes, 10 holes, 11 holes, 12 holes, 13 holes, 14 holes, 15 holes, 16 holes, 17 holes, 18 holes, 19 holes, 20 holes, etc.). In some embodiments, all of the holes are formed entirely within the tab or tabs. In other words, in some embodiments, no holes are formed in the tab that remove material from the outer edge of the tab or tabs. In some embodiments, at least one of the holes formed in the tab or tabs is/are formed by removing material from the outer edge of the tab or tabs.

Figure 5:
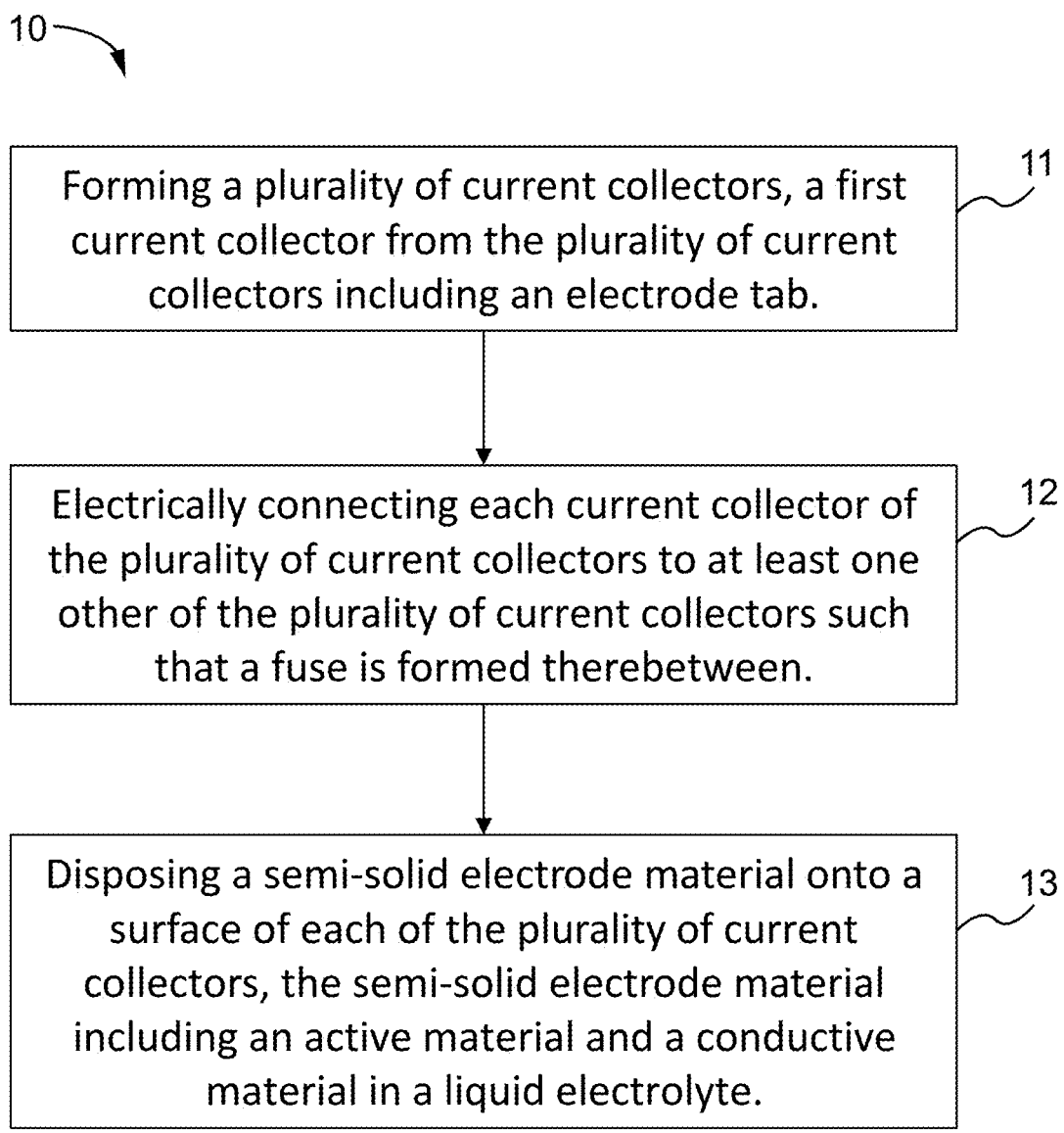
FIG. 5 illustrates a method for manufacturing an electrode, according to an embodiment.

FIG. 5 illustrates a method 10 for manufacturing an electrochemical cell, the method including forming a plurality of current collectors, such as those described herein, a first current collector from the plurality of current collectors including an electrode tab, at 11.

The method 10 further includes electrically coupling each current collector of the plurality of current collectors to at least one other of the plurality of current collectors such that a fuse is formed therebetween, at 12. In some embodiments, the fuse can function during normal operation of the electrochemical cell such that multiple electrode can be operated in parallel or in series, collectively comprising either the cathode or the anode. In some embodiments, the fuse can include any conductive material having a form factor and compositional quality suitable such that the fuse breaks when at least one of the current level, the voltage, and/or the temperature rises above a predetermined current threshold, a predetermined voltage threshold, and/or a predetermined temperature threshold, respectively.

The method 10 further includes disposing an electrode material (e.g., a semi-solid electrode material) onto a surface of each of the plurality of current collectors, at 13. In some embodiments, the semi-solid electrode material can include an active material and a conductive material in a liquid electrolyte. The semi-solid electrode material can be any composition described herein, or any other suitable semi-solid electrode material. In some embodiments, the semi-solid electrode material can include the active material and the liquid electrolyte without necessarily including the conductive material. In some embodiments, the electrode material can be deposited onto at least a portion of a surface of each of the plurality of current collectors. In some embodiments, the electrode material can be deposited onto at least a portion of both surfaces of each of the plurality of current collectors. In some embodiments, the electrode material is not deposited onto the fuse material electrically coupling each of the current collectors together.

Figure 6:
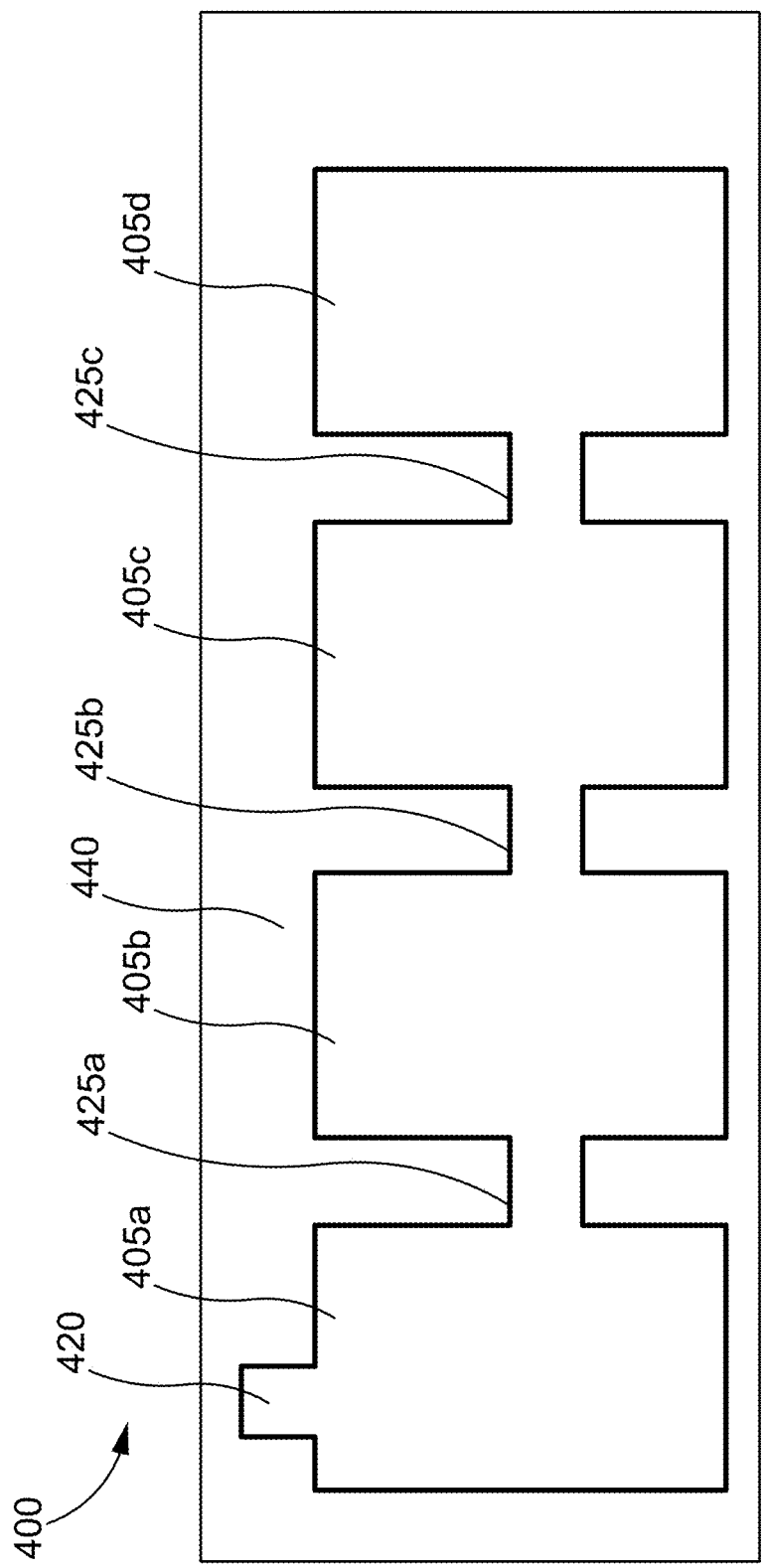
FIG. 6 shows a top view of an electrode manufactured according to the method of FIG. 5.

FIG. 6 illustrates an electrode 400 including a first current collector 405a, a second current collector 405b, a third current collector 405c, and a fourth current collector 405d (collectively, "current collectors 405"), such as those described herein, where the first current collector 405a includes an electrode tab 420. As shown in FIG. 6, the current collectors 405 are electrically coupled by way of a fuse 425a, 425b, 425c, each fuse configured to break to discontinue current communication through the electrode tab 420 when a current level or a voltage exceeds a predetermined current threshold or a predetermined voltage level, respectively. In some embodiments, at least one of the current collectors 405a, 405b, 405c, 405d can be configured to communicate between about 1 mA/cm$^2$ to about 2,000 mA/cm$^2$, about 5 mA/cm$^2$ to about 1,500 mA/cm$^2$, about 10 mA/cm$^2$ to about 1,000 mA/cm$^2$, about 5 mA/cm$^2$ to about 1,000 mA/cm$^2$, or about 1 mA/cm$^2$ to about 1,000 mA/cm$^2$, inclusive of all values and ranges therebetween. In some embodiments, the current collectors 405a, 405b, 405c, 405d can be configured to communicate current as described above with a corresponding increase in current collector temperature of less than about 50° C., about 40° C., about 30° C., about 20° C., about 10° C., or about 5° C., inclusive of all values and ranges therebetween. In some embodiments, at least one of the fuses 425a, 425b, 425c can be configured to be activated by between about 1 mAh/cm$^2$ and about 500 mA/cm$^2$, about 5 mAh/cm$^2$ and about 400 mA/cm$^2$, about 10 mAh/cm$^2$ and about 300 mA/cm$^2$, about 20 mAh/cm$^2$ and about 200 mA/cm$^2$, about 1 mAh/cm$^2$ and about 450 mAh/cm$^2$, about 1 mAh/cm$^2$ and about 400 mA/cm$^2$, about 1 mAh/cm$^2$ and about 350 mA/cm$^2$, about 1 mAh/cm$^2$ and about 300 mA/cm$^2$, about 1 mAh/cm$^2$ and about 250 mA/cm$^2$, about 1 mAh/cm$^2$ and about 200 mA/cm$^2$, about 1 mAh/cm$^2$ and about 150 mA/cm$^2$, about 1 mAh/cm$^2$ and about 100 mA/cm$^2$, about 5 mAh/cm$^2$ and about 500 mA/cm$^2$, about 10 mAh/cm$^2$ and about 500 mA/cm$^2$, about 20 mAh/cm$^2$ and about 500 mA/cm$^2$, about 50 mAh/cm$^2$ and about 500 mA/cm$^2$, about 100 mAh/cm$^2$ and about 500 mA/cm$^2$, about 150 mAh/cm$^2$ and about 500 mA/cm$^2$, about 200 mAh/cm$^2$ and about 500 mA/cm$^2$, about 250 mAh/cm$^2$ and about 500 mA/cm$^2$, about 300 mAh/cm$^2$ and about 500 mA/cm$^2$, about 350 mAh/cm$^2$ and about 500 mA/cm$^2$, about 400 mAh/cm$^2$ and about 500 mA/cm$^2$, about 450 mAh/cm$^2$ and about 500 mA/cm$^2$, about 50 mAh/cm$^2$ and about 500 mA/cm$^2$, about 50 mAh/cm$^2$ and about 500 mA/cm$^2$, In some embodiments, the electrode 400 can be at least partially contained within a pouch material 440. In some embodiments, the electrode tab 420 can extend beyond the pouch material 440. In some embodiments, the current collectors 405 can be configured to fold, stack, be wound, or otherwise conform to a non-planar configuration.

In some embodiments, an electrode material can be disposed onto at least one surface of each current collector 405, or onto both surfaces of each current collector 405. In some embodiments, the electrode material can be a semi-solid electrode material, such as described herein.

Figure 7:
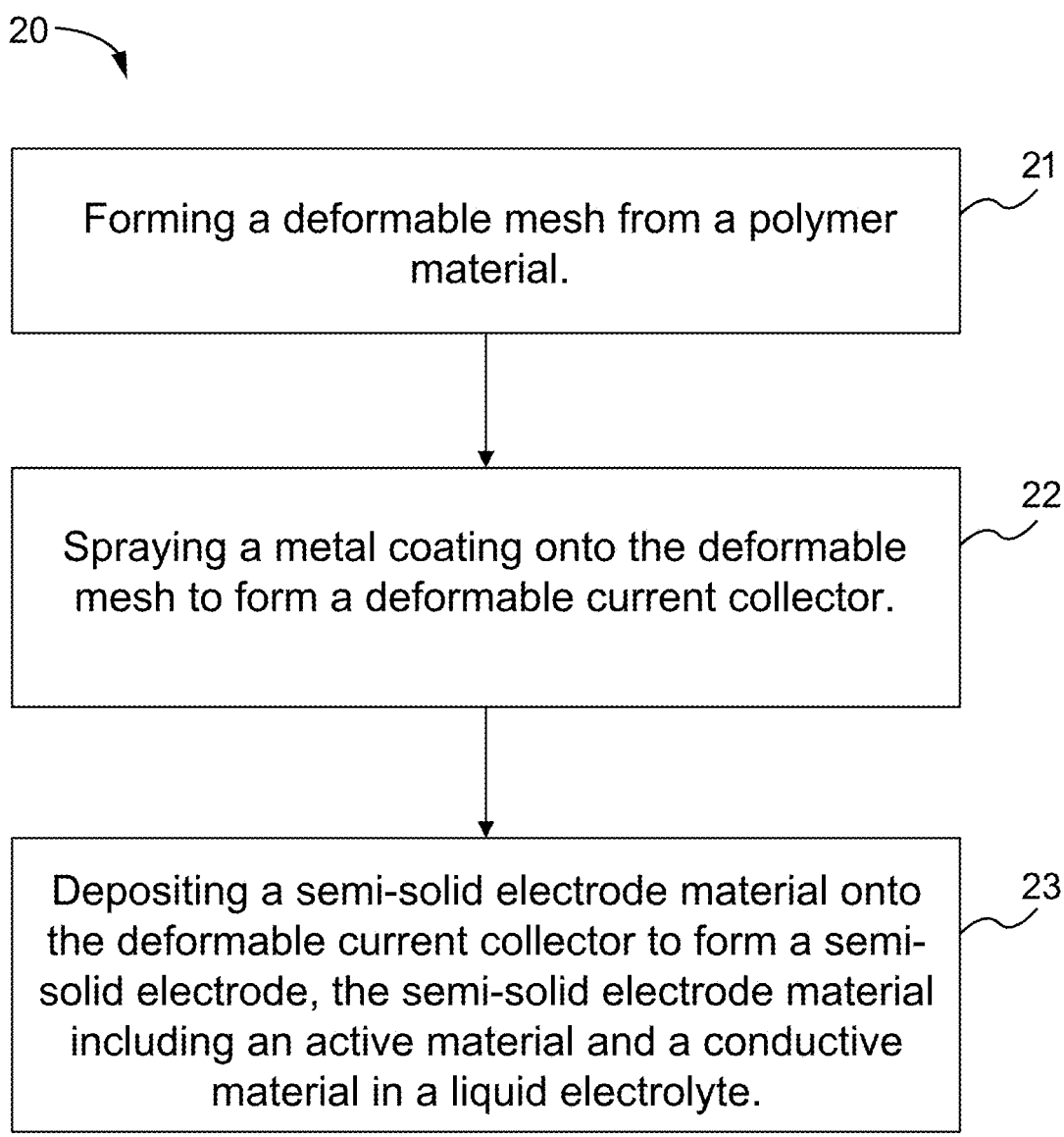
FIG. 7 illustrates a method for manufacturing an electrode, according to an embodiment.

In some embodiments, the pouch material 440 can be a first pouch material and the current collectors 405 can be a first plurality of current collectors having a first electrode material disposed on at least one of the surfaces of each of the first plurality of current collectors, collectively the "first electrode". In some embodiments, an electrochemical cell, such as a single pouch cell, can be formed by interposing an ion-permeable membrane between the first electrode and a second electrode, the second electrode including a second plurality of current collectors having a second electrode material disposed on a first surface of each of the current collectors, and having a second pouch material coupled to a second surface of each of the current collectors. In other words, the electrode shown in FIG. 6 can be a cathode and can be paired with an anode having the same or similar form factor and an ion-permeable membrane interposed therebetween, the resulting assembly being enclosed or substantially enclosed by pouch material and stacked, folded, or wound to form the finished electrochemical cell. In some embodiments, when a fuse or multiple fuses is/are activated during abnormal electrochemical cell conditions, the pouch material, e.g., a laminate plastic pouch material, can melt or partially melt to provide additional protection. In some embodiments, since the plurality of current collectors are electrically coupled via the fuse material, a terminal electrode from among the plurality of electrodes can include an electrode tab while the remaining electrodes from the plurality of electrodes do not include an electrode tab. In other words, since the remaining electrodes do not include a FIG. 7 illustrates a method 20 for manufacturing an electrode, the method including forming a deformable mesh from a polymer material, at 21. In some embodiments, the polymer material can be selected such that the deformable mesh at least partially deforms, melts, disintegrates, breaks, or is otherwise affected by an increase in current level, voltage, temperature, or a combination thereof. The polymer material can be any suitable polymer, plastic, rubber, synthetic rubber, silicone-containing, or bio-based material. By way of example only and without wishing to limit the scope of this disclosure in any way, the polymer material can include polyethylene (PE), polypropylene (PP), polystyrene (PS), polyvinyl (PV), polyvinyl chloride (PVC), polymethyl methacrylate, intrinsically conducting polymers, stretch-oriented polyacetylene, bioplastics, polyamides, polycarbonates, polyesters, high-density polyethylene, low-density polyethylene, polyethylene terephthalate, polyurethanes, polyvinylidene chloride, acrylonitrile butadiene styrene (ABS), polycarbonate/ABS, polyepoxide, polytetrafluoroethylene, phenolics, phenol formaldehyde, melamine formaldehyde, urea-formaldehyde, polyetheretherketone (PEEK), polyetherimide (PEI), plastarch, polylactic acid (PLA), polysulfone, silicone, furan, other suitable materials, and any combination thereof.

The method 20 further includes depositing a metal coating onto the deformable mesh to form a deformable current collector, at 22. In some embodiments, a metal material, such as nickel, copper, aluminum, carbon, gold, or any other suitably conductive material based on the redox chemistry described herein, can be coated onto the deformable mesh. In some embodiments, the metal material can be mixed with a solvent or other liquid and spray onto the deformable mesh. In some embodiments, the deformable mesh can be electroplated with the metal material. In some embodiments, the deformable mesh can be dip coated into a bath containing the metal material. In some embodiments, the metal material can be laminated onto the deformable mesh. In some embodiments, the metal material can be disposed onto the deformable mesh via chemical vapor deposition (CVD) or similar methods. In some embodiments, the metal material can be disposed onto the deformable mesh via a spattering process.

The method 20 further includes depositing a semi-solid electrode material onto the deformable current collector to form a semi-solid electrode the semi-solid electrode material including an active material and a conductive material in a liquid electrolyte, at 23. In some embodiments, at least a portion of the deformable current collector can extend beyond the deposited semi-solid electrode material to form an electrode tab. In some embodiments, the semi-solid electrode material can be disposed onto only one side of the deformable current collector. In some embodiments, the semi-solid electrode material can be disposed onto both sides of the deformable current collector.

In some embodiments, the deformable current collector is configured to deform when a current level reaches or exceeds a predetermined current threshold. In some embodiments, the current collector is configured to deform when a voltage level reaches or exceeds a predetermined voltage threshold. In some embodiments, the current collector is configured to deform when a temperature of the current collector reaches or exceeds a predetermined temperature threshold. Without wishing to be bound by any particular theory, when the deformable current collector is caused to deform, the deformable mesh material can deform (e.g., melt or partially melt), causing the metal coating thereon to deform also, which can reduce or discontinue completely the communication of electrical current through the electrode tab.

In some embodiments, the electrode can be a cathode or an anode. In some embodiments, wherein the electrode is a cathode, the method 20 can further include interposing an ion-permeable membrane, such as those described herein, between the cathode and an anode to form an electrochemical cell.

In some embodiments, an electrode can include more than one of the embodiments described herein. For example, in some embodiments, the electrode can include the current collector manufactured by spray-coating a plastic mesh with a metal material and a portion of the electrode tab can be removed according to any of the methods described herein to form a fuse within the electrode tab. In some embodiments, the electrode can include a plurality of current collectors electrically coupled together using thin strips of electrically conductive material configured to act as a fuse and a portion of the electrode tab can be removed according to any of the methods described herein to form a fuse within the electrode tab. In some embodiments, the electrode can include a plurality of current collectors electrically coupled together using thin strips of electrically conductive material configured to act as a fuse, the plurality of current collectors manufactured by spray-coating a plastic mesh with a metal material, a portion of the electrode tab being removed according to any of the methods described herein to form a fuse within the electrode tab.

Figure 8D:
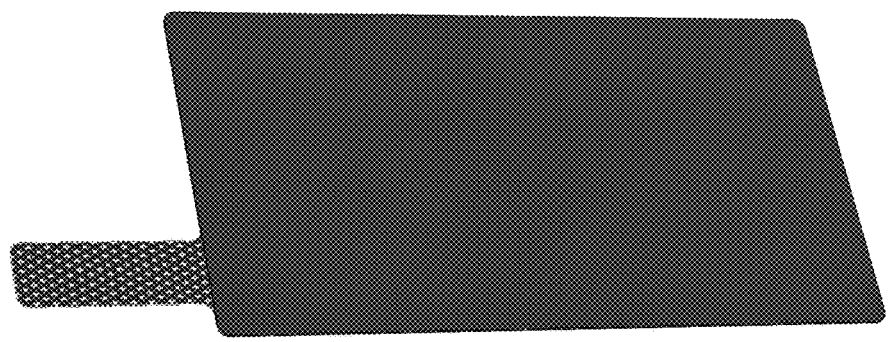
FIGS. 8A-8D show perspective views of an electrode at each stage of the method of FIG. 7.
Figure 8C:
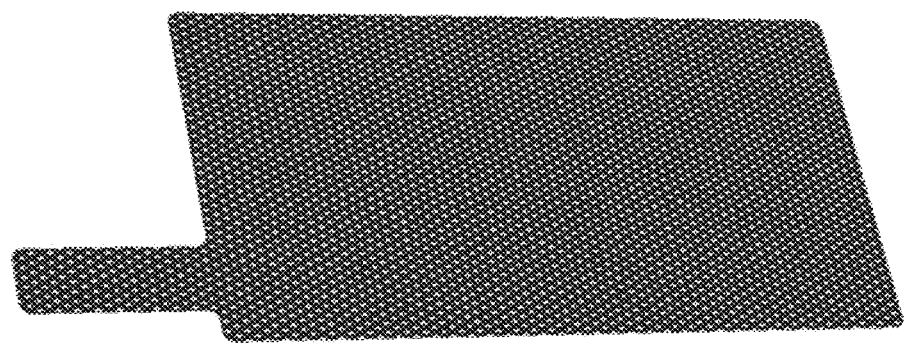
Figure 8B:
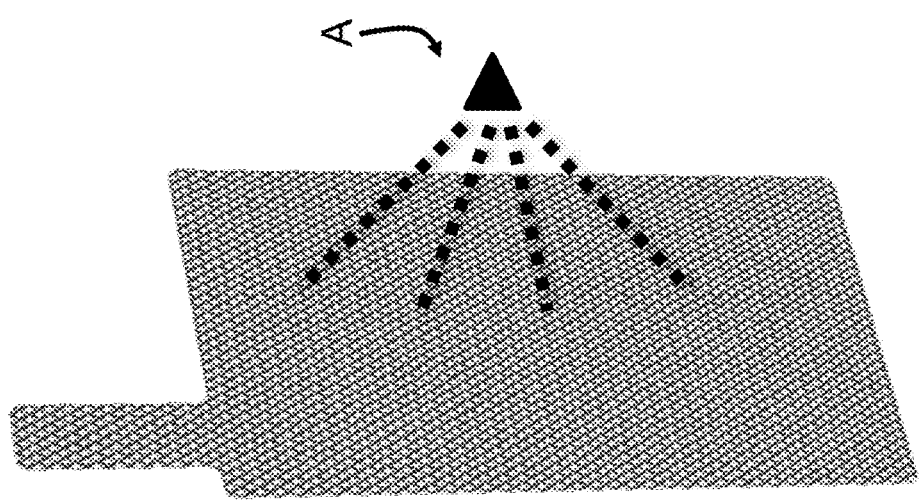
Figure 8A:
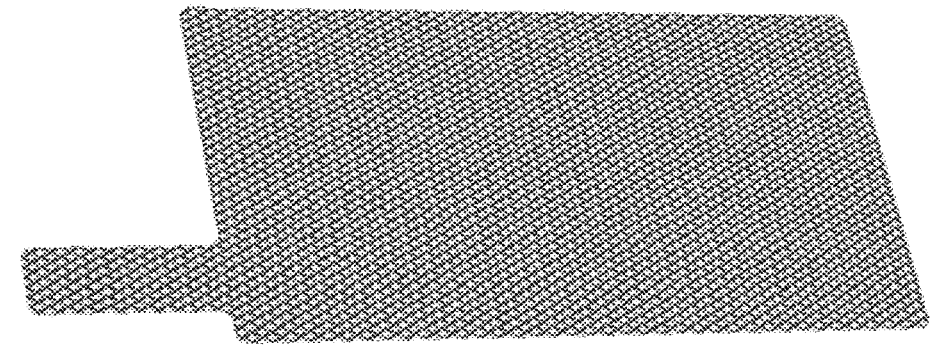

FIGS. 8A-8D show a perspective view of an electrode at different steps of the method 20 of FIG. 7. FIG. 8A illustrates a deformable mesh material, according to a particular form factor, however any suitable form factor can be chosen based on the desired form factor of the finished electrode and/or electrochemical cell. In some embodiments, the deformable mesh material can be stamped, cut, or otherwise manufactured from a larger portion of deformable mesh material. In some embodiments, the deformable mesh can include or be a woven deformable material and can be manufactured according to any suitable weaving process, extruding process, or the like. As shown in FIGS. 8A-8D, the current collector can include an electrode tab. In some embodiments, the electrode tab can be formed simultaneously with the current collector according to the method 20 or the like. In some embodiments, the electrode tab can be formed at a different time and coupled to the current collector or another component of the electrode at a later time.

In some embodiments, a metal coating can be disposed onto at least one side of the deformable mesh, indicated as process A in FIG. 8B. While FIG. 8B illustrates a process, e.g., spray-deposition, whereby the metal coating is applied from a distance, any suitable deposition process, such as those processes described above with regard to method 20 can be used to deposit the metal coating onto the deformable mesh. In some embodiments, after a time, such as a curing time, a cooling time, a solvent evaporation time, or another such time, the deformable current collector, as shown in FIG. 8C, is finished.

In some embodiments, as shown in FIG. 8D, an electrode material can be disposed onto at least one surface of the deformable current collector to form the finished electrode. The electrode material can be deposited onto at least one surface of the deformable current collector according to any suitable method, such as slurry casting, spray deposition, extrusion, drop casting, or the like. In some embodiments, the electrode material can include a semi-solid electrode material including an active material and a liquid electrolyte. In some embodiments, the semi-solid electrode material can further include a conductive additive. In some embodiments, the electrode material can be deposited onto a main portion of the deformable current collector but not onto the electrode tab, as shown in FIG. 8D. In some embodiments, the electrode material can be deposited onto both sides of the deformable current collector.

To provide an overall understanding, certain illustrative embodiments have been described; however, it will be understood by one of ordinary skill in the art that the systems, apparatuses, and methods described herein can be adapted and modified to provide systems, apparatuses, and methods for other suitable applications and that other additions and modifications can be made without departing from the scope of the systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

Conventional terms in the field of electrochemical cells have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The invention claimed is:

1. An electrochemical cell, comprising:
a cathode including a cathode material disposed on a cathode current collector;
an anode including an anode material disposed on an anode current collector; and
an ion-permeable membrane interposed between the cathode and the anode,
wherein a component of at least one of the cathode and the anode is configured to deform when a current level reaches or exceeds a predetermined current threshold,
wherein at least one of the cathode current collector and the anode current collector includes a mesh comprising a polymer material, the mesh configured to at least partially deform, melt, disintegrate, or break when the current level reaches or exceeds a predetermined current threshold.

2. The electrochemical cell of claim 1, wherein the mesh is coated with a metal to form a porous current collector.

3. The electrochemical cell of claim 2, wherein at least one of the cathode material and the anode material includes a mixture of a solid active material and a liquid electrolyte, the mixture being coated on the porous current collector.

4. The electrochemical cell of claim 2, wherein at least a portion of the porous current collector extends beyond the ion-permeable membrane to form at least one of a cathode tab and an anode tab.

5. The electrochemical cell of claim 1, wherein the cathode current collector is a first current collector of a plurality of current collectors, the plurality of current collectors electrically coupled together via a plurality of fuses, the first current collector of the plurality of current collectors including an electrode tab,
wherein the cathode material includes a mixture of a solid active material and a liquid electrolyte.

6. The electrochemical cell of claim 1, wherein the anode current collector is a first current collector of a plurality of current collectors, the plurality of current collectors electrically coupled together via a plurality of fuses, the first current collector of the plurality of current collectors including an electrode tab, wherein the anode material includes a mixture of a solid active material and a liquid electrolyte.

7. An electrochemical cell, comprising:
a cathode including a cathode material disposed on a cathode current collector;
an anode including an anode material disposed on an anode current collector; and
an ion-permeable membrane interposed between the cathode and the anode,
wherein at least one of the anode current collector and the cathode current collector includes a deformable mesh comprising a polymer material, the deformable mesh configured to at least partially deform, melt, disintegrate, or break when the current level reaches or exceeds a predetermined current threshold.

8. The electrochemical cell of claim 7, wherein the deformable mesh material is coated with a metal to form a porous current collector.

9. The electrochemical cell of claim 8, wherein at least one of the cathode material and the anode material includes a mixture of a solid active material and a liquid electrolyte, the mixture being coated on the porous current collector.

10. The electrochemical cell of claim 8, wherein at least a portion of the porous current collector extends beyond the ion-permeable membrane to form at least one of a cathode tab and an anode tab.

11. The electrochemical cell of claim 7, wherein the cathode current collector is a first current collector of a plurality of current collectors, the plurality of current collectors electrically coupled together via a plurality of fuses, the first current collector of the plurality of current collectors including an electrode tab,
wherein the cathode material includes a mixture of a solid active material and a liquid electrolyte.

12. The electrochemical cell of claim 7, wherein the anode current collector is a first current collector of a plurality of current collectors, the plurality of current collectors electrically coupled together via a plurality of fuses, the first current collector of the plurality of current collectors including an electrode tab,
wherein the anode material includes a mixture of a solid active material and a liquid electrolyte.

13. An electrochemical cell, comprising:
a first electrode material disposed on a first current collector;
a second electrode material disposed on a second current collector; and
an ion-permeable membrane interposed between the first electrode material and the second electrode material,
wherein at least one of the first current collector and the second current collector includes a polymer mesh substrate coated with a metal, the polymer mesh substrate configured to melt, disintegrate, or break when a current level reaches or exceeds a predetermined current threshold.

14. The electrochemical cell of claim 13, wherein the polymer mesh substrate is deformable.

15. The electrochemical cell of claim 13, wherein at least one of the first electrode material and the second electrode material includes a mixture of a solid active material and a liquid electrolyte, the mixture being coated on the current collector.

16. The electrochemical cell of claim 13, wherein at least a portion of the porous current collector extends beyond the ion-permeable membrane to form an electrode tab.

17. The electrochemical cell of claim 13, wherein the first current collector is electrically coupled to a plurality of additional current collectors via a plurality of fuses, the first current collector including an electrode tab,
wherein the first electrode material includes a mixture of a solid active material and a liquid electrolyte.

18. The electrochemical cell of claim 13, wherein the second current collector is electrically coupled to a plurality of additional current collectors via a plurality of fuses, the second current collector including an electrode tab,
wherein the second electrode material includes a mixture of a solid active material and a liquid electrolyte.

* * * * *